United States Patent
Yoshikawa et al.

(10) Patent No.: US 8,104,678 B2
(45) Date of Patent: Jan. 31, 2012

(54) PAYMENT APPROVAL SYSTEM AND METHOD FOR APPROVING PAYMENT FOR CREDIT CARD

(75) Inventors: Susumu Yoshikawa, Saitama (JP); Masayuki Ise, Tokyo (JP); Daisuke Sato, Tokyo (JP)

(73) Assignee: Intelligent Wave, Inc., Tokyo (JP)

( * ) Notice: Subject to any disclaimer, the term of this patent is extended or adjusted under 35 U.S.C. 154(b) by 62 days.

(21) Appl. No.: 12/446,285

(22) PCT Filed: Nov. 28, 2007

(86) PCT No.: PCT/JP2007/072952
§ 371 (c)(1),
(2), (4) Date: Apr. 20, 2009

(87) PCT Pub. No.: WO2009/069202
PCT Pub. Date: Jun. 4, 2009

(65) Prior Publication Data
US 2010/0327056 A1    Dec. 30, 2010

(51) Int. Cl.
*G06K 5/00* (2006.01)
(52) U.S. Cl. .................. 235/380; 235/492; 235/451
(58) Field of Classification Search .................. 235/380, 235/487, 451, 492
See application file for complete search history.

(56) References Cited

U.S. PATENT DOCUMENTS

2010/0130172 A1 * 5/2010 Vendrow et al. .............. 455/411

FOREIGN PATENT DOCUMENTS

| JP | 2004 334775 | 11/2004 |
|---|---|---|
| JP | 2005 025306 | 1/2005 |
| JP | 2005 275459 | 10/2005 |
| JP | 2005 301945 | 10/2005 |
| JP | 2005 339472 | 12/2005 |
| JP | 2006 313440 | 11/2006 |
| JP | 2007 207011 | 8/2007 |

OTHER PUBLICATIONS

JCB TIS Lightwell, "ASP-gata Service ni yori Tei-cost deno Card Fusei Kenchi System Donyu mo Kano Ni", CardWave, Sep. 10, 2001, vol. 14, No. 10, & Eng language Abst.
Kin'Yu Joho System Hakusho (Heisei 11 Nendo) 1st edition, 1st edition, Kabushiki Kaisha Zaikei Shohosha, Dec. 2, 1998, & English language Abstract.

* cited by examiner

*Primary Examiner* — Edwyn Labaze
(74) *Attorney, Agent, or Firm* — Schiff Hardin LLP

(57) ABSTRACT

A payment approval system and a method for approving a payment for credit cards are provided for providing efficient processing while maintaining accuracy in detection of fraud usage of credit cards with an IC chip. Fraud parameters obtained by modeling a pattern of fraud usage is stored in the IC chip equipped in the IC credit card to use for payment approval to achieve improved reliability of offline approval. When offline approval process finds a possibility of fraud usage, online approval for more detailed statistical analysis processing is requested to a host computer. When update information of the fraud parameter used for the judgment is transmitted together with the request for approval and the newest fraud parameter created by analyzing the newest transaction trend etc. is confirmed to have been updated at the host computer, the newest fraud parameter along with the approval result from the host computer is transmitted to the IC terminal to update the fraud parameter in the IC chip to the up-to-date state.

22 Claims, 14 Drawing Sheets

Fig. 5

| Item Name | Item Value |
|---|---|
| Reception Time | 20071103123000 |
| Membership Number | 1234567890123456 |
| Transaction Type | 1 |
| Payment Section | 1 |
| Merchant Code | 23456 |
| Amount of Spending | 30000 |
| Product Code | 9876543 |
| Destination Country Code | 81 |
| . . . | |

Fig. 6

| Date Used | Time Used | Transaction Type | Payment Section | Merchant Code | Amount (Yen) | Product Code | ... |
|---|---|---|---|---|---|---|---|
| ... | | | | | | | |
| 2007/11/1 | 07:30:21 | 1 | 2 | 10001 | 50,000 | 1234567 | |
| 2007/11/1 | 07:45:59 | 1 | 1 | 10001 | 30,000 | 1345678 | |
| 2007/11/2 | 17:01:15 | 1 | 1 | 12345 | 3,000 | 2345678 | |
| 2007/11/3 | 10:05:01 | 1 | 2 | 54321 | 100,000 | 2456789 | |
| 2007/11/3 | 11:00:32 | 1 | 1 | 54321 | 50,000 | 8765431 | |
| 2007/11/3 | 11:15:23 | 1 | 2 | 54321 | 80,000 | 8765432 | |

Fig. 7

| Item Name | Item Value |
|---|---|
| Last Time Received by Host | 20071103111523 |
| Last Transaction Type | 1 |
| Last Payment Section | 2 |
| Last Merchant code | 54321 |
| Last Amount of Spending | 80000 |
| Last Product Code | 8765432 |
| Last Destination Country Code | 81 |
| Amount of Spending for Last 5 Purchases | 263000 |
| Average Time Difference for Last 5 Purchases | 051500 |
| Usage Frequency Factor by Time Period | 48 |
| Usage Frequency Factor by Day of Week | 7 |
| . . . | |

PAYMENT APPROVAL SYSTEM AND METHOD FOR APPROVING PAYMENT FOR CREDIT CARD

FIELD OF THE INVENTION

The present invention relates to a payment approval system and a method for approving a payment for credit cards in order to efficiently detect fraud usage of the credit card equipped with an IC chip.

DESCRIPTION OF THE RELATED ART

Upon usage of a credit card, a store etc. which accepted usage of the card inquires of a host computer at the credit card company about a possibility of fraud usage in addition to checking the credit balance in order to prevent a person who picked up the card from pretending to be the owner of the card and conducting fraud transactions. In inquiring of fraud usage, a scoring model for calculating a possibility of fraud usage as a score is commonly used (e.g., see Patent Document 1).

However, performing an online approval process by communicating with the host computer to apply the scoring model every time a credit card is used increases a load on the system for the credit card company, and could degrade quality of service to customers due to latency time for communication. Since IC credit cards equipped with an IC chip have been more commonly used in recent years, inventions for allowing offline approval under certain conditions by setting certain conditions for credit judgment in the IC chips have been disclosed in order to deal with the problem described above (e.g., see Patent Document 2).

Moreover, inventions have been disclosed for restricting the number of transactions for online communication by refusing usage of the card when the conditions written in the IC chips are not satisfied on the precondition that online approval is used (e.g., see Patent Document 3). As such a condition, a floor limit, which requires online approval for a payment higher than a fixed amount of money is commonly used.

Patent Document 1: Japanese Unexamined Patent Publication (Kokai) No. 2007-207011

Patent Document 2: Japanese Unexamined Patent Publication (Kokai) No. 2006-313440

Patent Document 3: Japanese Unexamined Patent Publication (Kokai) No. 2005-025306

DISCLOSURE OF THE INVENTION

Problem to be Solved by the Invention

As described above, the number of online approvals to be performed is desirably as small as possible considering the load on the system for the credit card company and the latency time for customers. On the other hand, a system for maintaining reliability of detecting fraud usage is also desired in order to prevent fraud usage as much as possible.

In the invention disclosed in Patent Document 2, a payment for a small amount under a fixed credit line is approved using an offline process only. However, this system could not only overlook fraud usage when the amount is under the credit line, but also is difficult to be applied for transactions with a large amount of money. In the invention disclosed in Patent Document 3, the possibility of fraud usage is judged from an area where a credit card is used and an installation location of a terminal unit. This system uses limited elements for judgment compared with generally used scoring models, and the possibility of detecting fraud usage offline is restricted.

Therefore, an efficient method with reliability close to the scoring model in detecting fraud usage offline while reducing the number of online approval processes have been desired to be provided by utilizing functions of IC credit cards.

The present invention was devised to deal with such problems. Therefore, it is an object of the present invention to provide a payment approval system and a method for approving a payment for credit cards in order to provide efficient processing while maintaining the reliability in detecting fraud usage of the credit cards equipped with an IC chip.

Means for Solving the Problem

A first invention according to this application provides a payment approval system for a credit card, the payment approval system comprising: a terminal unit provided with read and write functions for an IC chip equipped in a credit card; and a host computer system connected to the terminal unit via a network, characterized in that the terminal unit comprises: a payment request receiving means for accepting a payment request with a credit card; a fraud parameter reading means for reading a first fraud parameter stored in the IC chip, the first fraud parameter obtained by modeling a pattern of fraud usage of the credit card; a fraud parameter applying means for judging whether a possibility of fraud usage of the payment request satisfies criteria for requiring online approval by comparing the payment request to the first fraud parameter; a payment information transmitting means for transmitting payment information generated from the payment request to the host computer system when the fraud parameter applying means judges that the criteria for requiring online approval is satisfied, and the host computer system comprises: a fraud parameter storage means for storing a second fraud parameter obtained by modeling the pattern of fraud usage of the credit card; a payment approval judging means for judging whether the possibility of fraud usage of the payment request satisfies the criteria for approving the payment by comparing the payment information received from the terminal unit to the second fraud parameter stored in the second fraud parameter storage means; and a determined result transmitting means for transmitting a determined result of approval or disapproval judged by the payment approval judging means to the terminal unit.

According to the first invention, the fraud parameter obtained by modeling the pattern of fraud usage is stored in the IC chips equipped in the credit card and is read to the terminal unit for use in order to improve the reliability of offline detection of fraud usage, and to reduce the number of transactions which requires online approval. The first fraud parameter stored in the IC chip is simplified compared with the second fraud parameter used for judgment in the host side computer system; therefore, an approval process at the terminal side can be simplified, and when a more accurate analysis is required, a more accurate approval process can be performed in the host side computer system.

Moreover, the first invention can also be characterized in that the terminal unit is provided with a fraud parameter update means for updating the first fraud parameter stored in the IC chip with a new fraud parameter, and the payment information transmitting means transmits update information for specifying the update time of the first fraud parameter read from the IC chip, as well as the payment information, to the host computer system when the fraud parameter applying means judges that the criteria for requiring online approval is satisfied, and the host computer system comprises: a first fraud parameter storage means for storing the first fraud parameter based on the same model as the fraud parameter stored in the IC chip; an update information judging means for judging whether the update information received from the terminal unit matches the update information for specifying the update time of the newest first fraud parameter stored in the first fraud parameter storage means; a fraud parameter transmitting means for reading the newest first fraud parameter from the first fraud parameter storage means and transmitting the newest first fraud parameter to the terminal unit when the update information judging means judges that the update information do not match, and the fraud parameter update means of the terminal unit updates the first fraud parameter stored in the IC chip with the newest first fraud parameter transmitted from the host computer system.

This structure allows the first fraud parameter used for offline approval to be updated with the fraud parameter reflected with a newest transaction trend etc. upon performing online approval, resulting in improved reliability of offline detection of fraud usage.

Moreover, the first invention can also be characterized in that the payment information transmitted by the payment information transmitting means of the terminal unit comprises identification information for identifying the user of the credit card, and the first fraud parameter storage means of the host computer system stores the first fraud parameter configured for each user of the credit card, the first fraud parameter being related to the identification information, and the fraud parameter transmitting means of the host computer system reads the newest first fraud parameter corresponding to the identification information included in the payment information from the first fraud parameter storage means and transmits to the terminal unit.

This structure allows the fraud parameter to be reflected with the transaction trend etc. for each user of the credit card, resulting in improved reliability of offline detection of fraud usage.

Additionally, the first invention can also be characterized in that the terminal unit comprises: a history information reading means for reading history information stored in the IC chip, the history information being related to usage history of the credit card; and a history information update means for updating the history information stored in the IC chip with a reflection of the payment by the payment request when the payment request is approved, and the fraud parameter applying means judges whether the possibility of fraud usage of the payment request satisfies the criteria for requiring online approval by comparing the payment request and the history information to the fraud parameter.

This structure allows the detection of fraud usage with the fraud parameter to perform analysis reflecting the past transaction history in addition to the target transaction, resulting in improved reliability of offline detection of fraud usage.

Besides, the first invention can also be characterized in that the terminal unit comprises: a risk parameter reading means for reading a risk parameter configured with a rule for requiring online approval about the credit card stored in the IC chip; a risk parameter applying means for judging whether the payment request satisfies the rule for requiring online approval by comparing the payment request to the risk parameter; and a second payment information transmitting means for transmitting payment information generated from the payment request to the host computer system when the risk parameter applying means judges that the rule for requiring online approval is satisfied.

This structure allows selecting transactions which require online approval with a multilateral judgment without increasing the load of offline processing since mechanical judgments with simple criteria, such as amount of spending (online approval is required when the amount is not less than a certain amount such as several ten thousand yen, for example), frequency of usage (online approval is required once in several times, for example) etc., can be used together offline.

In addition, the first invention can also be characterized in that the terminal unit comprises: a risk parameter update means for updating the risk parameter stored in the IC chip with a new risk parameter, and the second payment information transmitting means transmits the update information for specifying the update time of the risk parameter read from the IC chip, as well as the payment information, to the host computer system when the risk parameter applying means judges that the rule for requiring online approval is satisfied, and the host computer system comprises: a risk parameter storage means for storing the risk parameter configured with the rule for requiring online approval about the credit card; an update information judging means for judging whether the update information received from the terminal unit matches the update information for specifying the update time of the newest risk parameter stored in the risk parameter storage means; and a risk parameter transmitting means for reading the newest risk parameter from the risk parameter storage means and transmitting to the terminal unit when the update information judging means judges that the update information do not match, and the risk parameter update means of the terminal unit updates the risk parameter stored in the IC chip with the newest risk parameter transmitted from the host computer system.

This structure allows the risk parameter used for offline approval to be updated with the risk parameter based on new criteria upon performing online approval, resulting in systematical handling of the processing criteria with the risk parameter.

Furthermore, the first invention can also be characterized in that the payment information transmitted by the second payment information transmitting means of the terminal unit includes identification information for identifying the user of the credit card, and the risk parameter storage means of the host computer system stores the risk parameter configured for each user of the credit card, the risk parameter being related to the identification information, and the risk parameter transmitting means of the host computer system reads the newest risk parameter corresponding to the identification information included in the payment information from the risk parameter storage means and transmits to the terminal unit.

This structure allows the risk parameter to be reflected with the transaction trend etc. for each user of the credit card, resulting in improved reliability of offline detection of fraud usage, and efficient selection of transactions, which requires online approval.

Although the processes for offline approval are performed at the terminal unit according to the first invention, such processes may be performed in an IC chip equipped in a credit card according to a payment approval system for the credit card in accordance with a second invention of the present invention.

The second invention according to this application provides a payment approval system for a credit card, the payment approval system comprising: a credit card equipped with an IC chip; and a host computer system connected to a terminal unit provided with read and write functions for information stored in the IC chip via a network, characterized in that the credit card comprises: a fraud parameter storage means for storing a first fraud parameter obtained by modeling a pattern of fraud usage of the credit card; a payment request receiving means for accepting a payment request with the credit card from the terminal unit; a fraud parameter reading means for reading the first fraud parameter from the fraud parameter storage means; a fraud parameter applying means for judging whether a possibility of fraud usage of the payment request satisfies criteria for requiring online approval by comparing the payment request to the first fraud parameter; and a payment information transmitting means for instructing the terminal unit to transmit the payment information generated from the payment request to the host computer system when the fraud parameter applying means judges that criteria for requiring online approval is satisfied, and the host computer system comprises: a fraud parameter storage means for storing a second fraud parameter obtained by modeling the pattern of fraud usage of the credit card; a payment approval judging means for judging whether the possibility of fraud usage of the payment information satisfies the criteria for approving the payment by comparing the payment information received from the terminal unit to the second fraud parameter stored in the second fraud parameter storage means; and a determined result transmitting means for transmitting a determined result of approval or disapproval judged by the payment approval judging means to the terminal unit.

Moreover, the second invention can also be characterized in that the credit card comprises: a fraud parameter update means for updating the first fraud parameter stored in the fraud parameter storage means with a new fraud parameter, and the payment information transmitting means instructs the terminal unit to transmit update information for specifying an update time of the first fraud parameter read from the IC chip, as well as the payment information, to the host computer system when the fraud parameter applying means judges that the criteria for requiring online approval is satisfied, and the host computer system comprises: a first fraud parameter storage means for storing the first fraud parameter based on the same model as the fraud parameter stored in the IC chip; an update information judging means for judging whether the update information received from the terminal unit matches the update information for specifying the update time of the newest first fraud parameter stored in the first fraud parameter storage means; and a fraud parameter transmitting means for reading the newest first fraud parameter from the first fraud parameter storage means and transmitting the newest first fraud parameter to the terminal unit when the update information judging means judges that the update information do not match, and the fraud parameter update means of the credit card updates the first fraud parameter stored in the IC chip with the newest first fraud parameter received by the terminal unit from the host computer system.

Moreover, the second invention can also be characterized in that the payment information instructed by the payment information transmitting means of the credit card for transmission includes identification information for identifying the user of the credit card, and the first fraud parameter storage means of the host computer system stores the first fraud parameter configured for each user of the credit card, the first fraud parameter being related to the identification information, and the fraud parameter transmitting means of the host computer system reads the newest first fraud parameter corresponding to the identification information included in the payment information from the first fraud parameter storage means and transmits to the terminal unit.

Additionally, the second invention can also be characterized in that the credit card comprises: a history information storage means for storing history information about usage history of the credit card; a history information reading means for reading the history information from the history information storage means; and a history information update means for updating the history information stored in the history information storage means with a reflection of the payment by the payment request when the payment request is approved, and the fraud parameter applying means judges whether the possibility of fraud usage of the payment request satisfies the criteria for requiring online approval by comparing the payment request and the history information to the fraud parameter.

Besides, the second invention can also be characterized in that the credit card comprises: a risk parameter storage means for storing a risk parameter configured with a rule for requiring online approval about the credit card; a risk parameter reading means for reading the risk parameter stored in the risk parameter storage means; a risk parameter applying means for judging whether the payment request satisfies the rule for requiring online approval by comparing the payment request to the risk parameter; and a second payment information transmitting means for instructing the terminal unit to transmit the payment information generated from the payment request to the host computer system when the risk parameter applying means judges that the rule for requiring online approval is satisfied.

In addition, the second invention can also be characterized in that the credit card comprises: a risk parameter update means for updating the risk parameter stored in the risk parameter storage means with a new risk parameter, and the second payment information transmitting means instructs the terminal unit to transmit update information for specifying an update time of the risk parameter read from the IC chip, as well as the payment information, to the host computer system when the risk parameter applying means judges that the rule for requiring online approval is satisfied, and the host computer system comprises: a risk parameter storage means for storing the risk parameter configured with the rule for requiring online approval about the credit card; an update information judging means for judging whether the update information received from the terminal unit matches the update information for specifying the update time of a newest risk parameter stored in the risk parameter storage means; and a risk parameter transmitting means for reading the newest risk parameter from the risk parameter storage means and transmitting the newest risk parameter to the terminal unit when the update information judging means judges that the update information do not match, and the risk parameter update means of the credit card updates the risk parameter stored in the risk parameter storage means with the newest risk parameter received by the terminal unit from the host computer system.

Furthermore, the second invention can also be characterized in that the payment information instructed by the second payment information transmitting means of the credit card for transmission includes identification information for identifying the user of the credit card, and the risk parameter storage means of the host computer system stores the risk parameter configured for each user of the credit card, the risk parameter being related to the identification information, and the risk parameter transmitting means of the host computer system reads the newest risk parameter corresponding to the identification information included in the payment information from the risk parameter storage means and transmits to the terminal unit.

The first and second inventions of the present invention can also be specified as a method for approving a payment of the credit card performed by each structure of the payment approval system for the credit card according to each aspect.

The method for approving a payment of the credit card in accordance with the first invention is performed by the terminal unit provided with read and write functions for the IC chip equipped in the credit card and the host computer system connected to the terminal unit via the network, the method for approving a payment comprising: a step for the terminal unit to accept the payment request with the credit card; a fraud parameter reading step for the terminal unit to read the first fraud parameter obtained by modeling the pattern of fraud usage of the credit card stored in the IC chip; a fraud parameter applying step for the terminal unit to judge whether a possibility of fraud usage of the payment request satisfies criteria for requiring online approval by comparing the payment request to the first fraud parameter; a payment information transmitting step for the terminal unit to transmit payment information generated from the payment request to the host computer system when the fraud parameter applying step judges that the criteria for requiring online approval is satisfied; a payment approval judging step for judging whether the possibility of fraud usage of the payment request satisfies the criteria for approving the payment by the host computer system comparing the payment information received from the terminal unit to the second fraud parameter stored in the fraud parameter storage means for storing the second fraud parameter obtained by modeling the pattern of fraud usage of the credit card; and a determined result transmitting step for the host computer system to transmit the determined result of approval or disapproval judged at the payment approval judging step to the terminal unit.

Moreover, the method for approving a payment of the credit card in accordance with the first invention can also comprise: an update information judging step, in which if the fraud parameter applying step judges that criteria for requiring online approval is satisfied, the terminal unit at the payment information transmitting step transmits the update information for specifying the update time of the first fraud parameter read from the IC chip, as well as the payment information, to the host computer system, and the host computer system judges whether the update information received from the terminal unit matches the update information for specifying the update time of the newest first fraud parameter stored in the first fraud parameter storage means for storing the first fraud parameter based on the same model as the fraud parameter stored in the IC chip; a fraud parameter transmitting step for reading the newest first fraud parameter from the first fraud parameter storage means and transmitting the newest first fraud parameter to the terminal unit when the update information judging step judges that the update information do not match; and a fraud parameter update step for the terminal unit to update the first fraud parameter stored in the IC chip with the newest first fraud parameter transmitted from the host computer system.

Moreover, the method for approving a payment of the credit card in accordance with the first invention can also be characterized in that the terminal unit transmits the payment information including the identification information for identifying the user of the credit card to the host computer system at the payment information transmitting step, and the first fraud parameter storage means of the host computer system stores the first fraud parameter configured for each user of the credit card, the first fraud parameter being related to the identification information, and the host computer system reads the newest first fraud parameter corresponding to the identification information included in the payment information from the first fraud parameter storage means and transmits to the terminal unit at the fraud parameter transmitting step.

Additionally, the method for approving a payment of the credit card in accordance with the first invention can also comprise: a history information reading step for the terminal unit to read the history information about the usage history of the credit card stored in the IC chip; and a history information update step for the terminal unit to update the history information stored in the IC chip with a reflection of the payment by the payment request when the payment request is approved, characterized in that the terminal unit judges at the fraud parameter applying step whether the possibility of fraud usage of the payment request satisfies the criteria for requiring online approval by comparing the payment request and the history information to the fraud parameter.

Besides, the method for approving a payment of the credit card in accordance with the first invention can also comprise: a risk parameter reading step for the terminal unit to read the risk parameter configured with the rule for requiring online approval about the credit card stored in the IC chip; a risk parameter applying step for the terminal unit to judge whether the payment request satisfies the rule for requiring online approval by comparing the payment request to the risk parameter; and a second payment information transmitting step for the terminal unit to transmit the payment information generated from the payment request to the host computer system when the risk parameter applying step judges that the rule for requiring online approval is satisfied.

In addition, the method for approving a payment of the credit card in accordance with the first invention can also comprise: an update information judging step, in which if the risk parameter applying step judges that the rule for requiring online approval is satisfied, the terminal unit at the second payment information transmitting step transmits the update information for specifying the update time of the risk parameter read from the IC chip, as well as the payment information, to the host computer system, and the host computer system judges whether the update information received from the terminal unit matches the update information for specifying the update time of the newest risk parameter stored in the risk parameter storage means for storing the risk parameter configured with the rule for requiring online approval about the credit card; a risk parameter transmitting step for the host computer system to read the newest risk parameter from the risk parameter storage means and to transmit the newest risk parameter to the terminal unit when the update information judging step judges that the update information do not match; and a risk parameter update step for the terminal unit to update the risk parameter stored in the IC chip with the newest risk parameter transmitted from the host computer system.

Furthermore, the method for approving a payment of the credit card in accordance with the first invention can also be characterized in that the terminal unit transmits the payment information including the identification information for identifying the user of the credit card to the host computer system at the second payment information transmitting step, and the risk parameter storage means of the host computer system stores the risk parameter configured for each user of the credit card, the risk parameter being related to the identification information, and the host computer system reads the newest risk parameter corresponding to the identification information included in the payment information from the risk parameter storage means and transmits the newest risk parameter to the terminal unit at the risk parameter transmitting step.

The method for approving a payment of the credit card in accordance with the second invention is performed by a credit card equipped with an IC chip and a host computer system connected to a terminal unit provided with read and write functions for information stored in the IC chip via a network, the method for approving a payment comprising: a step for the credit card to accept the payment request with the credit card from the terminal unit; a fraud parameter reading step for the credit card to read the first fraud parameter from the fraud parameter storage means for storing the first fraud parameter obtained by modeling the pattern of fraud usage of the credit card; a fraud parameter applying step for the credit card to judge whether the possibility of fraud usage of the payment request satisfies criteria for requiring online approval by comparing the payment request to the first fraud parameter; a payment information transmitting step for the credit card to instruct the terminal unit to transmit payment information generated from the payment request to the host computer system when the fraud parameter applying step judges that the criteria for requiring online approval is satisfied; a payment approval judging step for judging whether the possibility of fraud usage of the payment request satisfies the criteria for approving the payment by the host computer system comparing the payment information received from the terminal unit to the second fraud parameter stored in the fraud parameter storage means for storing the second fraud parameter obtained by modeling the pattern of fraud usage of the credit card; and a determined result transmitting step for the host computer system to transmit the determined result of approval or disapproval judged at the payment approval judging step to the terminal unit.

Moreover, the method for approving a payment of the credit card in accordance with the second invention can also comprise: an update information judging step, in which if the fraud parameter applying step judges that criteria for requiring online approval is satisfied, the credit card at the payment information transmitting step instructs the terminal unit to transmit update information for specifying an update time of the first fraud parameter read from the IC chip, as well as the payment information, to the host computer system, and the host computer system judges whether the update information received from the terminal unit matches the update information for specifying the update time of the newest first fraud parameter stored in the first fraud parameter storage means for storing the first fraud parameter based on the same model as the fraud parameter stored in the IC chip; a fraud parameter transmitting step for reading the newest first fraud parameter from the first fraud parameter storage means and transmitting the newest first fraud parameter to the terminal unit when the update information judging step judges that the update information do not match; and a fraud parameter update step for the credit card to update the first fraud parameter stored in the fraud parameter storage means with the newest first fraud parameter received by the terminal unit from the host computer system.

Moreover, the method for approving a payment of the credit card in accordance with the second invention can also be characterized in that the credit card instructs the terminal unit to transmit the payment information including the identification information for identifying the user of the credit card to the host computer system at the payment information transmitting step, and the first fraud parameter storage means of the host computer system stores the first fraud parameter configured for each user of the credit card, the first fraud parameter being related to the identification information, and the host computer system reads the newest first fraud parameter corresponding to the identification information included in the payment request from the first fraud parameter storage means and transmits the newest first fraud parameter to the terminal unit at the fraud parameter transmitting step.

Additionally, the method for approving a payment of the credit card in accordance with the second invention can also comprise: a history information reading step for the credit card to read the history information from the history information storage means for storing the history information about the usage history of the credit card; and a history information update step for the credit card to update the history information stored in the history information storage means with a reflection of the payment by the payment request when the payment request is approved, characterized in that the credit card judges at the fraud parameter applying step whether the possibility of fraud usage of the payment request satisfies the criteria for requiring online approval by comparing the payment request and the history information to the fraud parameter.

Besides, the method for approving a payment of the credit card in accordance with the second invention can also comprise: a risk parameter reading step for the credit card to read the risk parameter from the risk parameter storage means for storing the risk parameter configured with the rule for requiring online approval about the credit card; a risk parameter applying step for the credit card to judge whether the payment request satisfies the rule for requiring online approval by comparing the payment request to the risk parameter; and a second payment information transmitting step for the credit card to instruct the terminal unit to transmit payment information generated from the payment request to the host computer system when the risk parameter applying step judges that the rule for requiring online approval is satisfied.

In addition, the method for approving a payment of the credit card in accordance with the second invention can also comprise: an update information judging step, in which if the risk parameter applying step judges that the rule for requiring online approval is satisfied, the credit card at the second payment information transmitting step instructs the terminal unit to transmit update information for specifying an update time of the risk parameter read from the IC chip, as well as the payment information, to the host computer system, and the host computer system judges whether the update information received from the terminal unit matches the update information for specifying the update time of the newest risk parameter stored in the risk parameter storage means for storing the risk parameter configured with the rule for requiring online approval about the credit card; and a risk parameter transmitting step for the host computer system to read the newest risk parameter from the risk parameter storage means and transmitting the newest risk parameter to the terminal unit when the update information judging step judges that the update information do not match; and a risk parameter update step for the credit card to update the risk parameter stored in the risk parameter storage means with the newest risk parameter transmitted from the host computer system.

Furthermore, the method for approving a payment of the credit card in accordance with the second invention can also be characterized in that the credit card instructs the terminal unit to transmit the payment information including the identification information for identifying the user of the credit card to the host computer system at the second payment information transmitting step, and the risk parameter storage means of the host computer system stores the risk parameter configured for each user of the credit card, the risk parameter being related to the identification information, and the host computer system reads the newest risk parameter corresponding to the identification information included in the payment information from the risk parameter storage means and transmits the newest risk parameter to the terminal unit at the risk parameter transmitting step.

EFFECT OF THE INVENTION

According to the present invention, functions of IC credit cards can be efficiently used to improve the reliability of offline approval with the fraud parameter stored in the IC chip and to reduce the number of transactions which requires online approval, resulting in less load on the system processing in the host side computer systems for a credit card company etc. and improved customer service from a shorter latency time to obtain approval.

DESCRIPTION OF PREFERRED EMBODIMENTS

The best mode for carrying out the present invention will be, hereinafter, described in detail with reference to the attached drawings. The following description is provided as an example of the embodiments of the present invention and does not intend to limit the present invention thereto. For example, offline approval may be performed using a part of parameters or history information illustrated below, or some parameters may be common to all cardholders, or data processing for offline approval may be performed in an IC credit card.

FIGS. 1 and 2 are first and second block diagrams, respectively, showing the structure of a payment approval system for conventional credit cards. FIGS. 3 and 4 are block diagrams showing the structures of the payment approval system for the credit cards in accordance with the first and second embodiments of the present invention, respectively. FIG. 5 shows a first example of history information used by the payment approval system for the credit cards in accordance with the present invention. FIG. 6 shows a second example of the history information used by the payment approval system for the credit cards in accordance with the present invention. FIG. 7 shows an example of authorization data used by the payment approval system for the credit cards in accordance with the present invention. FIG. 8 is a flow chart showing the flow of the approval process on the terminal side in the method for approving a payment of the credit card in accordance with the first embodiment of the present invention. FIG. 9 is a flow chart showing the process flow in the host side computer system in the method for approving a payment of the credit card in accordance with the present invention. FIG. 10 is a second flow chart showing the flow of an update process of parameters etc. on the terminal side in the method for approving a payment of the credit card in accordance with the present invention. FIG. 11 is a flow chart showing the flow of the approval process on the terminal side in the method for approving a payment of the credit card in accordance with the second embodiment of the present invention. FIG. 12 is a flow chart showing the flow of the approval process in the IC card in the method for approving a payment of the credit card in accordance with the second embodiment of the present invention. FIG. 13 is a first figure showing that the efficiency of the approval process can be improved while maintaining reliability with the payment approval system for the credit card in accordance with the present invention. FIG. 14 is a second figure showing that the efficiency of the approval process can be improved while maintaining reliability with the payment approval system for the credit card in accordance with the present invention.

FIGS. 1 and 2 show the general structures of current payment approval systems using the IC credit cards. When a payment is settled using an IC credit card 10, an IC terminal 20 installed at a merchant etc. of the credit card reads information stored in the IC credit card 10, and offline approval using the IC terminal 20 and the IC credit card 10 or online approval in a host computer 30 at a credit card company etc. is performed to judge whether the payment with the IC credit card 10 should be accepted or rejected.

In FIG. 1, the IC chip equipped in the IC credit card 10 is assigned with a storage area for a card information storage section 11 and a risk parameter storage section 12 as well as a CPU for performing data processing. The IC terminal 20 is a computer to read information from the IC chip in the IC credit card 10 to perform predetermined data processing, and is provided with a payment request receiving section 21, an authentication processing section 22, and an approval processing section 23. The payment request receiving section 21, the authentication processing section 22, and the approval processing section 23 are each provided with a specific function, and an application program for each function is read into the memory area in the IC terminal 20 to perform data processing with the CPU in order to implement each function.

As shown in FIG. 2, the functions corresponding to the authentication processing section 22 and the approval processing section 23 may be provided in the IC chip of the IC credit card 10 (an authentication processing section 15 and an approval processing section 16). In that case, the data processing is performed with the CPU in the IC chip of the IC credit card 10 based on application programs stored in the IC chip of the IC credit card 10.

The card information storage section 11 stores a membership number to identify the IC credit card 10, a password registered by the user of the IC credit card 10, a key for distinguishing a counterfeit card, etc. The authentication processing section 22 performs an authentication process of the IC credit card 10 by reading the information from the card information storage section 11 to distinguish a counterfeit card using the key, and by performing authentication from whether the password mentioned above and the password inputted into the IC terminal 20 match. The authentication process may be performed in the authentication processing section 15 of the IC credit card 10. When the authentication process results in an error, the payment with the IC credit card 10 will not be accepted.

The risk parameter storage section 12 stores risk parameters configured with rules for requiring online approval, such as quantitative criteria including a floor limit to define that online approval is required for a payment higher than a fixed amount of money and frequency to require online approval, a random number to perform online approval at random, etc. When the payment request receiving section 21 of the IC terminal 20 accepts a payment request with an amount of spending etc. specified, the approval processing section 23 reads the risk parameters from the risk parameter storage section 12, and compares the amount of spending etc. specified in the payment request to the risk parameters in order to judge whether the rule for requiring online approval is satisfied. The approval process may be performed in the approval processing section 16 of the IC credit card 10, or the approval process may be performed at the IC credit card 10 after performing the authentication process at the IC terminal 20.

When the approval processing section 23 judges that online approval is necessary, the authorization data including a membership number, the merchant code, the amount of spending, etc. required for approval of the payment is transmitted to the host computer 30. When the approval processing section 23 judges that online approval is not necessary, the payment is approved offline and the payment with the IC credit card 10 is accepted.

The host computer 30 is equipped with an approval processing section 31, an authorization data storage section 32, and a fraud parameter storage section 33. The approval processing section 31 is provided with a specific function, and an application program for the approval process is read into a memory area in the host computer 30 to perform data processing with the CPU to perform the approval process. The authorization data storage section 32 for storing the authorization data for transactions of the past for each member and the fraud parameter storage section 33 for storing the fraud parameters obtained by modeling the pattern of fraud usage of the credit card may be assigned to a predetermined storage area of an HDD of the host computer 30 or to a database server etc. connected to the host computer 30. The host computer 30 is not limited to a single computer, but may include a plurality of computers, or may be an external computer whose part of the functions are connected to the card company's computer via a network.

The host computer 30 which received the authorization data activates the approval processing section 31 and compares the received authorization data to the fraud parameter stored in the fraud parameter storage section 33 in order to judge whether the possibility of fraud usage satisfies the criteria for approving the payment. When the possibility of fraud usage is scored, past transaction history etc. of the member stored in the authorization data storage section 32 may be used. Information on acceptance/rejection for the approval is transmitted to the IC terminal 20 to indicate the acceptance/rejection of the payment with the IC credit card 10.

As described above, the method commonly used at present does not perform scoring with the fraud parameter obtained by modeling the pattern of fraud usage at offline approval, and the judgment whether online approval should be performed is made based on quantitative criteria and random numbers. Although it is desirable to increase the percentage of offline approval as much as possible considering the load on communication lines and the host side computer system, this method, as shown in FIG. 13, poses a problem of degrading reliability because the increased percentage of the offline approval proportionally increases the number of fraud offline transactions. In the same manner, as shown in FIG. 14, less use of refinement with the risk parameters in order to reduce the load on the communication lines and the host side computer system by increasing the percentage of offline approval increases the number of the fraud transactions in offline approval.

With the problems described above, it is desirable to perform judgments with the fraud parameters using statistical analyses also in offline approval in order to improve the reliability of offline approval. Introduction of the statistical analyses in offline approval, as shown in FIG. 13, can increase the percentage of the offline transactions while preventing degradation of reliability thereby. At the same time, as shown in FIG. 14, even with less use of refinement with the risk parameters, the increase in the number of the fraud transactions in offline approval can also be maintained to be mild.

FIGS. 3 and 4 show the structures of the payment approval system for the credit card in accordance with the present invention, in which the judgment with the fraud parameters using the statistical analyses can also be performed in offline approval based on the above-mentioned consideration. In the first embodiment shown in FIG. 3, the approval process etc. is performed at the IC terminal 20, and in the second embodiment shown in FIG. 4, the approval process etc. is performed at the IC chip of the IC credit card 10.

In the structures shown in FIGS. 3 and 4, when a payment is settled using an IC credit card 10, an IC terminal 20 installed at a merchant etc. of the credit card reads information stored in the IC credit card 10, and offline approval using the IC terminal 20 and the IC credit card 10 or online approval in a host computers 30 at a credit card company etc. is performed to judge whether the payment by the IC credit card 10 should be accepted or rejected.

In FIG. 3, the IC chip equipped in the IC credit card 10 is assigned with a storage area for a card information storage section 11, a risk parameter storage section 12, a fraud parameter storage section 13, a history information storage section 14, as well as a CPU for performing data processing. The IC terminal 20 is a computer to read information from the IC chip in the IC credit card 10 to perform predetermined data processing, and is provided with a payment request receiving section 21, an authentication processing section 22, an approval processing section 23, and an update processing section 24. The payment request receiving section 21, the authentication processing section 22, the approval processing section 23, and the update processing section 24 are each provided with a specific function, and an application program for each function is read into the memory area in the IC terminal 20 to perform data processing with the CPU in order to implement each function.

As shown in FIG. 4, the functions corresponding to the authentication processing section 22, the approval processing section 23, and the update processing section 24 may be provided in the IC chip of the IC credit card 10 (an authentication processing section 15, an approval processing section 16, and an update processing section 17). In that case, the data processing is performed with the CPU in the IC chip of the IC credit card 10 based on application programs stored in the IC chip of the IC credit card 10.

The card information storage section 11 stores a membership number to identify the IC credit card 10, a password registered by the user of the IC credit card 10, a key for distinguishing a counterfeit card, etc. The authentication processing section 22 performs authentication process of the IC credit card 10 by reading the information from the card information storage section 11 to distinguish a counterfeit card using the key, and by performing authentication from whether the password mentioned above and the password inputted into the IC terminal 20 match. When the authentication process results in an error, the payment with the IC credit card 10 will not be accepted.

The above mentioned data processing performed at the authentication processing section 22 of FIG. 3 may be performed at the authentication processing section 15 of the IC credit card 10 shown in FIG. 4. In this case, the authentication processing section 15 of the IC credit card 10 performs data processing using the information read from the card information storage section 11 with the CPU in the IC chip of the IC credit card 10, and passes the authentication result to the authentication processing section 22 of the IC terminal 20.

The risk parameter storage section 12 stores risk parameters configured with rules for requiring online approval, such as quantitative criteria including a floor limit to define that online approval is required for a payment higher than a fixed amount of money and frequency to require online approval, a random number to perform online approval at random, etc. When the payment request receiving section 21 of the IC terminal 20 accepts a payment request with an amount of spending etc. specified, the approval processing section 23 reads the risk parameters from the risk parameter storage section 12, and compares the amount of spending etc. specified in the payment request to the risk parameters in order to judge whether the rule for requiring online approval is satisfied.

The data processing for approval using the risk parameters performed at the approval processing section 23 shown in FIG. 3 as described above may be performed at the approval processing section 16 of the IC credit card 10 shown in FIG. 4. In this case, information including the amount of spending etc. required for the approval process is passed from the approval processing section 23 of the IC terminal 20 to the approval processing section 16 of the IC credit card 10, and the authentication processing section 15 of the IC credit card 10 performs data processing using the parameter read from the risk parameter storage section 12 with the CPU in the IC chip of the IC credit card 10 and passes the approval result to the approval processing section 23 of the IC terminal 20. Although common parameters may be used as the risk parameters among members, different risk parameters are preferably configured for each member in order to make more reliable judgment with a reflection of a transaction trend etc. for each member.

The fraud parameter storage section 13 stores the fraud parameters obtained by modeling the pattern of fraud usage of the credit card obtained by statistically analyzing a trend of fraud usage in the past (usage at midnight and continuous usage in a short period of time have a high probability of fraud transactions, for example), a trend of normal transactions for each member, etc. For the payment request specified with the amount of spending etc. accepted by the payment request receiving section 21 of the IC terminal 20, the approval processing section 23 reads the fraud parameter from the fraud parameter storage section 13 and compares the amount of spending specified in the payment request, the date and time of acceptance for the payment request, etc. to the fraud parameters in order to judge whether the rule for requiring online approval is satisfied.

The data processing for approval using the fraud parameters performed at the approval processing section 23 shown in FIG. 3 as described above may be performed at the approval processing section 16 of the IC credit card 10 shown in FIG. 4. In this case, information including the amount of spending etc. required for the approval process is passed from the approval processing section 23 of the IC terminal 20 to the approval processing section 16 of the IC credit card 10, and the authentication processing section 15 of the IC credit card 10 performs data processing using the parameter read from the fraud parameter storage section 13 with the CPU in the IC chip of the IC credit card 10, and passes the approval result to the approval processing section 23 of the IC terminal 20. Although common parameters may be used as the fraud parameters among members, different risk parameters are preferably configured for each member in order to make more reliable judgment with a reflection of a transaction trend etc. for each member.

The history information storage section 14 stores the history information about the recent usage history of the credit card of the member of IC credit card 10. The judgment using the fraud parameters preferably uses the latest usage history in order to judge the possibility of the fraud transaction from the normal transaction trend for each member. For example, the latest history information is required in order to judge that the possibility of an fraud transaction is high when a member who usually uses the credit card only several times a month repeatedly uses the card in a short period of time or when a member who usually makes a payment of only about several ten thousand yen repeatedly makes large payments not less than 100,000 yen, etc.

Therefore, when the fraud parameters are read from the fraud parameter storage section 13 to judge whether the rule for requiring online approval is satisfied, in addition to the amount of spending specified in the payment request, the date and time of acceptance for the payment request, etc., the history information is preferably read from the history information storage section 14 and compared to the fraud parameter. In this case, the fraud parameter stored in the fraud parameter storage section 13 will include the model using the history information.

A form of the history information used herein is not particularly limited, and as shown in the example of FIG. 5, a part of the authorization data of the latest several usages may be stored by each record, or as shown in the example of FIG. 6, information on the last usage, an average of the last several times, etc. may be stored.

By the way, the fraud parameters obtained by modeling the pattern of fraud usage of the credit card are also used for online approval processes. In the present invention, the fraud parameters are also used for offline approval processes at the approval processing section 23 (in the case of FIG. 3) and at the approval processing section 16 (in the case of FIG. 4), but it is difficult to use the same fraud parameters and history information as the ones used on the host side when considering the storage capacity of the IC chip in the IC credit card 10, and the data processing capacity of the IC chip and the IC terminal 20. Therefore, in the present invention, a relatively simple model obtained by simplifying the fraud parameters and history information used by the host side is used for offline processing. When offline processing finds a possibility of fraud usage, the authorization data is transmitted to the host computer 30 to perform online approval.

In the judgment using the fraud parameters at the approval processing section 23 (in the case of FIG. 3) or at the approval processing section 16 (in the case of FIG. 4), a method of judging whether the rule for requiring online approval is satisfied is not in particular limited. However, as is generally performed in a judgment using the fraud parameters, a degree of matching with the model of fraud usage pattern may be scored, and online approval is judged to be necessary when the calculated score exceeds a predetermined threshold, for example.

The history information stored in the history information storage section 14 must be updated to reflect a new transaction after the transaction is conducted using the IC credit card 10. Therefore, when offline approval is performed at the approval processing section 23 (in the case of FIG. 3) or at the approval processing section 16 (in the case of FIG. 4), or when a notification for informing that online approval was performed is received from the approval processing section 31 of the host computer 30, the update processing section 24 is activated, and the history information stored in the history information storage section 14 of the IC credit card 10 is updated with the reception time, the amount of spending, etc. of the approved transaction.

Data processing for updating history information performed at the update processing section 24 shown in FIG. 3 as described above may be performed at the update processing section 17 of the IC credit card 10 shown in FIG. 4. In this case, the authorization data etc. required for update is passed from the update processing section 24 of the IC terminal 20 to the update processing section 17 of the IC credit card 10, and the history information stored in the history information storage section 14 is updated at the update processing section 17 of the IC credit card 10.

If the rule for requiring online approval is judged to be satisfied as a result of comparing the risk parameter or the fraud parameter at the approval processing section 23 (in the case of FIG. 3) or at the approval processing section 16 (in the case of FIG. 4), the payment request, such as the authorization data including the amount of spending etc., received at the payment request receiving section 21 is transmitted from the IC terminal 20 to the host computer 30. FIG. 7 shows an example of the authorization data to be transmitted. The authorization data includes information such as the membership number (card number) to identify the user of the IC credit card 10, the reception time, the merchant code, the amount of spending etc.

In this process, when the authorization data is transmitted, the update information for specifying the update time of the fraud parameters and the risk parameters read for use at the offline approval process are preferably transmitted as well. Although the form of the update information is not particularly limited, the last update date, symbols for indicating a file version, etc. may be used, for example.

The host computer 30 is equipped with the approval processing section 31, the authorization data storage section 32, the fraud parameter storage section 33, and a risk parameter storage section 34. The approval processing section 31 is provided with a specific function, and an application program for the approval process is read into a memory area in the host computer 30 to perform data processing with the CPU to perform the approval process. The authorization data storage section 32 for storing the authorization data for transactions of the past for each member and the fraud parameter storage section 33 for storing the fraud parameters obtained by modeling the pattern of fraud usage of the credit card may be assigned to a predetermined storage area of an HDD of the host computer 30, or to a database server etc. connected to the host computer 30.

The host computer 30 which received the authorization data activates the approval processing section 31 and compares the received authorization data to the fraud parameters stored in the fraud parameter storage section 33 in order to judge whether the possibility of fraud usage satisfies the criteria for approving the payment. Although common parameters may be used as the fraud parameters among members, different risk parameters are preferably configured for each member in order to make a more reliable judgment with a reflection of a transaction trend etc. for each member. In this case, since the fraud parameter storage section 33 stores by each member the fraud parameters with the membership number etc. for identifying the member, the fraud parameter to be used for a judgment may be specified using the membership number included in the authorization data as a key.

Also, as described above, the fraud parameters stored in the fraud parameter storage section 33 can use a more detailed model compared with the fraud parameter stored in the fraud parameter storage section 13 of the IC credit card 10 used for offline approval when considering differences of the storage capacity and processing capacity of the computers.

In addition, when scoring the possibility of fraud usage using the fraud parameter, as in the same manner as offline approval, the history information, such as member's past transaction history etc., stored in the authorization data storage section 32 may be used. As described above, more detailed analysis is possible since more information is stored in the authorization data storage section 32 compared with the history information stored in the history information storage section 14 of the IC credit card 10 used for offline approval.

Information on acceptance/rejection for approval of the payment with the IC credit card 10 judged at the approval processing section 31 is transmitted to the IC terminal 20. In the approval process at the host computer 30, the credit limit etc. configured for each member is referred, and when the amount of spending specified in the authorization data exceeds the credit limit, the payment is usually disapproval.

At the IC terminal 20, the information on acceptance/rejection of the payment with the IC credit card 10 is indicated, and at the same time, the update processing section 24 (in the case of FIG. 3) or the update processing section 17 (in the case of FIG. 4) is activated, and the history information stored in the history information storage section 14 of the IC credit card 10 is updated with a reflection of the approved transaction.

Along with the above-mentioned approval process, the approval processing section 31 compares the update information of the fraud parameter or the risk parameter transmitted from the IC terminal 20 with the update information for specifying the update time when each newest information was updated at the fraud parameter storage section 33 and the risk parameter storage section 34. The parameters stored in each of the fraud parameter storage section 33 and the risk parameter storage section 34 are updated to new parameters as transaction information including fraud usage is accumulated and a model reflecting a new trend is created.

When any of the update information does not match, the newest fraud parameters or risk parameters are read from the fraud parameter storage section 33 or the risk parameter storage section 34 and transmitted from the host computer 30 to the IC terminal 20 with the information on acceptance/rejection for the approval of the payment with the IC credit card 10 in order to update the fraud parameters or risk parameters stored in the IC credit card 10. At the IC terminal 20, the update processing section 24 (in the case of FIG. 3) or the update processing section 17 (in the case of FIG. 4) is activated, and the newest fraud parameters or risk parameters received from the host computer 30 is stored in the risk parameter storage section 12 or the fraud parameter storage section 13 of the IC credit card 10 to update the fraud parameter or the risk parameter.

Since the parameters stored in each of the fraud parameter storage section 33 and the risk parameter storage section 34 are updated when appropriate at the host computer 30, when the update information do not match, the update information at the host computer 30 should be newer. As described above, by performing the update process with the newest parameters at the time of the online approval process, the newest parameters are easily reflected also at the IC credit card 10 without performing a specific operation to update the parameters, resulting in improved reliability of offline approval.

The process flow of the method for approving a payment of the credit card in accordance with the first embodiment of the present invention will be described with reference to the flow charts in FIGS. 8 to 10. FIG. 8 shows the process flow at the IC terminal, which accepted a payment request. FIG. 9 shows the process flow in the host side computer system, which performs payment approval. FIG. 10 shows the process flow at the IC terminal, which accepted an approval result.

When a payment is performed with an IC credit card at a merchant etc. of the credit card, an IC terminal reads information in the IC credit card, and at the same time, the amount of spending for products to be purchased is inputted into the IC terminal to perform a payment request with the IC credit card. The IC terminal reads card information, including a membership number etc., from the IC chip equipped in the IC credit card, and at the same time, accepts the input of the amount of spending etc. (S01).

The IC terminal performs an authentication process of the card information using, for example, a key for identifying counterfeit cards, a password for authentication, etc. with the card information read from the IC chip (S02). This authentication process may also be performed at the arithmetic circuit of the IC chip. When the card used is judged not to be a legitimate card, or when the card is judged not to be used by a card holder (S03), error processing is performed and the payment with the IC credit card is canceled. The card information may include a credit limit per purchase, and the error processing may be performed when the amount of spending in the payment request exceeds the credit limit.

When the card is judged to be used by the legitimate card holder (S03), the risk parameters configured with the rule for requiring online approval are read from the IC chip equipped in the IC credit card (S04) to check whether the payment request exceeds the threshold to require online approval configured in the risk parameters (S05). The checking includes, for example, whether the amount of spending exceeds the amount of money configured to require online approval, and whether the frequency of usage with offline approval until the last usage exceeds the predetermined number of times. When the risk parameter exceeds the threshold, online approval is required without comparing the fraud parameters.

When the threshold is not exceeded (S05), a fraud parameter 1 obtained by modeling the pattern of fraud usage of the credit cards (simplified form of a fraud parameter 2 used in the host side computer system) and the history information including the latest transaction history of the credit card are read from the IC chip equipped in the IC credit card (S06) to perform statistical analysis processing based on a predetermined arithmetic expression (S07), in order to check whether the payment request matches the pattern of fraud usage configured in the fraud parameter 1 (S08). For example, the payment request is compared to the scoring model including the time to be used, the amount of spending, the location identified by the merchant code, etc. as variables to score the possibility of fraud usage. When the calculated score exceeds the predetermined threshold to indicate the possibility of fraud usage, online approval is required.

The order in which the process for applying the risk parameters described at S04 to S05 and the process for applying the fraud parameter 1 described at S06 to S08 may be reversed.

When the calculated score does not exceed the predetermined threshold and the possibility of fraud usage is low, offline approval is performed and approval of the payment etc. is displayed at the IC terminal (S09). In addition, the history information stored in the IC chip equipped in the IC credit card is updated with the reflection of the approved transaction (S10), and the approved authorization data is transmitted to the host computer to save in the host side computer system (S11).

When online approval is judged to be necessary at S05 or S08, the payment request accepted by the IC terminal is transmitted to the host computer in the form of authorization data etc. along with the update time of the risk parameters or the fraud parameter 1 read from the IC chip (S12).

The host computer receives the authorization data and the update time of the risk parameter or the fraud parameter 1 transmitted from the IC terminal (S13). The host side computer system refers to the update time of the newest risk parameter or fraud parameter 1 stored (S14) to compare with the update time of the risk parameter or the fraud parameter 1 received (S15). When the update time on the host side computer system has been updated and is newer than the update time on the IC chip side, the newest risk parameter or fraud parameter 1 is read (S16) and stored temporarily.

Then, in order to perform more detailed analysis processing than in offline approval, the fraud parameter 2 (more detailed information than the fraud parameter 1 stored in the IC credit card) obtained by modeling the pattern of fraud usage of the credit cards is read (S17) to perform statistical analysis processing based on a predetermined arithmetic expression in order to check whether the authorization data received matches the pattern of fraud usage configured in the fraud parameter 2 (S18) by comparing to the scoring model including the values included in the authorization data as variables to score the possibility of fraud usage. In this process, the information about the past transaction history may be read from the database etc. to save the authorization data to use for scoring just like the history information may be used offline.

When the calculated score does not exceed the predetermined threshold, the payment is approved and the approval result and the newest risk parameter or fraud parameter 1 stored temporarily are transmitted to the IC terminal (S19). In the approval process on the host side computer system, the credit limit etc. configured for each member is also referred, and when the amount of spending specified in the authorization data exceeds the credit limit, the payment is normally disapproved. Only the approval result is transmitted when the parameters have not been updated.

When the calculated score exceeds the predetermined threshold to indicate fraud usage, the payment with the IC credit card is disapproved, and the approval result and the newest risk parameter or fraud parameter 1 stored temporarily are transmitted to the IC terminal (S20). Only the approval result is transmitted when the parameters have not been updated as is in the case with approval. The authorization data used for the judgment is stored in the database to save the authorization data along with the approval result regardless of approval or disapproval (S21).

The IC terminal which received the approval result of the payment, and the newest risk parameter or fraud parameter 1 (S22) displays the approval result of the payment on the IC terminal (S23), and at the same time, writes the newest risk parameter or fraud parameter 1 received into the IC chip equipped in the IC credit card to update the information (S24).

The process flow of the method for approving a payment of the credit card in accordance with the second embodiment of the present invention will be described with reference to the flow charts in FIGS. 11 to 12. FIG. 11 shows the process flow at the IC terminal, which accepted the payment request. FIG. 12 shows the flow of the approval process performed in the IC chip of the IC credit card.

When a payment is performed with an IC credit card at a merchant etc. of the credit card, an IC terminal reads information in the IC credit card, and at the same time, the amount of spending for products to be purchased is inputted into the IC terminal to perform a payment request with the IC credit card. The IC terminal reads card information, including a membership number etc., from the IC chip equipped in the IC credit card, and at the same time, accepts the input of the amount of spending etc. (S25).

The IC terminal performs an authentication process of the card information using, for example, a key for identifying counterfeit cards, a password for authentication, etc. with the card information read from the IC chip (S26). This authentication process may also be performed at the arithmetic circuit of the IC chip. When the card used is judged not to be a legitimate card, or when the card is judged not to be used by a card holder (S27), error processing is performed and the payment with the IC credit card is canceled. The card information may include a credit limit per purchase, and the error processing may be performed when the amount of spending in the payment request exceeds the credit limit. When the card is judged to be used by the legitimate card holder (S27), information required for judgment of payment approval, such as the amount of spending inputted, is passed to the IC chip equipped in the IC credit card (S28).

The IC chip equipped in the IC credit card which accepted the information, including the amount of spending etc., from the IC terminal (S29) reads the risk parameter configured with the rule for requiring online approval (S30) to check whether the payment request exceeds the threshold to require online approval configured in the risk parameters (S31). The checking includes, for example, whether the amount of spending exceeds the amount of money configured to require online approval, and whether the frequency of usage with offline approval until the last usage exceeds the predetermined number of times. When the risk parameter exceeds the threshold, online approval is required without comparing the fraud parameters.

When the threshold is not exceeded (S31), a fraud parameter 1 obtained by modeling the pattern of fraud usage of the credit cards (simplified form of an fraud parameter 2 used in the host side computer system) and the history information including the latest transaction history of the credit card are read (S32) to perform statistical analysis processing based on a predetermined arithmetic expression (S33) in order to check whether the payment request matches the pattern of fraud usage configured in the fraud parameter 1 (S34). For example, the payment request is compared to the scoring model including the time to be used, the amount of spending, the location identified by the merchant code, etc. as variables to score the possibility of fraud usage. When the calculated score exceeds the predetermined threshold to indicate the possibility of fraud usage, online approval is required.

The order in which the process for applying the risk parameters described at S30 to S31 and the process for applying the fraud parameter 1 described at S32 to S34 may be reversed.

When the calculated score does not exceed the predetermined threshold and the possibility of fraud usage is low, the IC terminal is instructed to perform offline approval (S35) and the IC terminal displays approval of the payment, etc. In addition, the history information stored in the IC chip equipped in the IC credit card is updated with the reflection of the approved transaction (S36). Moreover, The IC terminal performs a transmission process etc. of the approved authorization data for saving in the host side computer system.

When the online approval is judged to be necessary at S31 or S34, information about the update time of the risk parameter or the fraud parameter 1 used for the approval process is passed to the IC terminal (S37). The IC terminal, which received the information, transmits the accepted payment request to the host computer in the form of authorization data etc. along with the risk parameter or the fraud parameter 1 passed from the IC chip.

Processes on the host computer side and update processes for parameters etc. after the approval process in the second embodiment described above are the same as that of the first embodiment shown in FIGS. 9 and 10. In the example described above, the IC terminal performs only the authentication process of the card, and the IC credit card performs the approval process using the risk parameter and the fraud parameter 1. However, part of the processes may be shared in a different manner. For example, the processes before the approval process using the risk parameters may be performed at the IC terminal.

BRIEF DESCRIPTION OF THE DRAWINGS

FIG. 5 shows a first example of history information used by the payment approval system for the credit cards in accordance with the present invention;

FIG. 6 shows a second example of the history information used by the payment approval system for the credit cards in accordance with the present invention;

FIG. 7 shows an example of authorization data used by the payment approval system for the credit cards in accordance with the present invention;

EXPLANATION OF LETTERS OR NUMERALS

Figure 1:
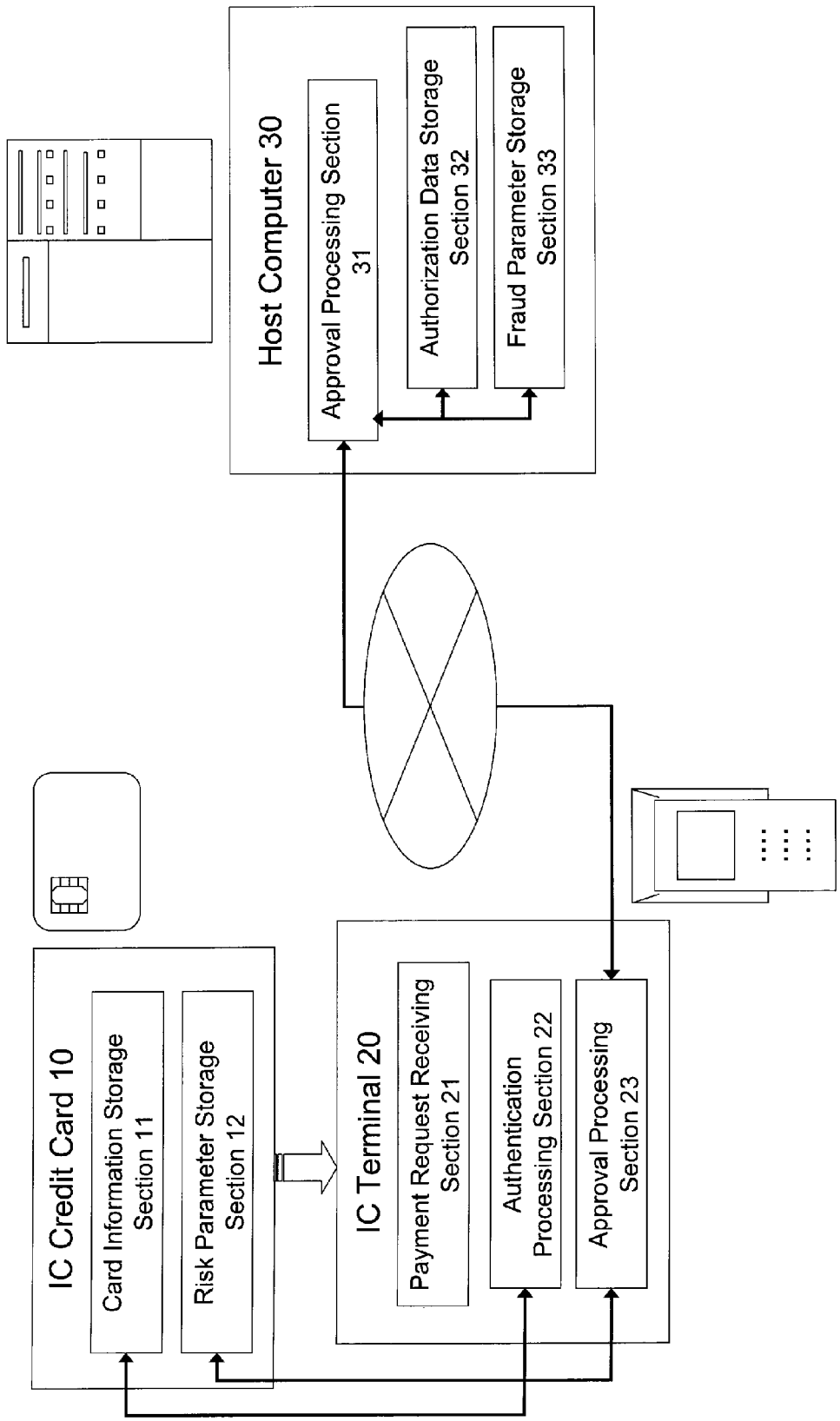
FIG. 1 is a first block diagram showing the structure of a payment approval system for conventional credit cards.
Figure 2:
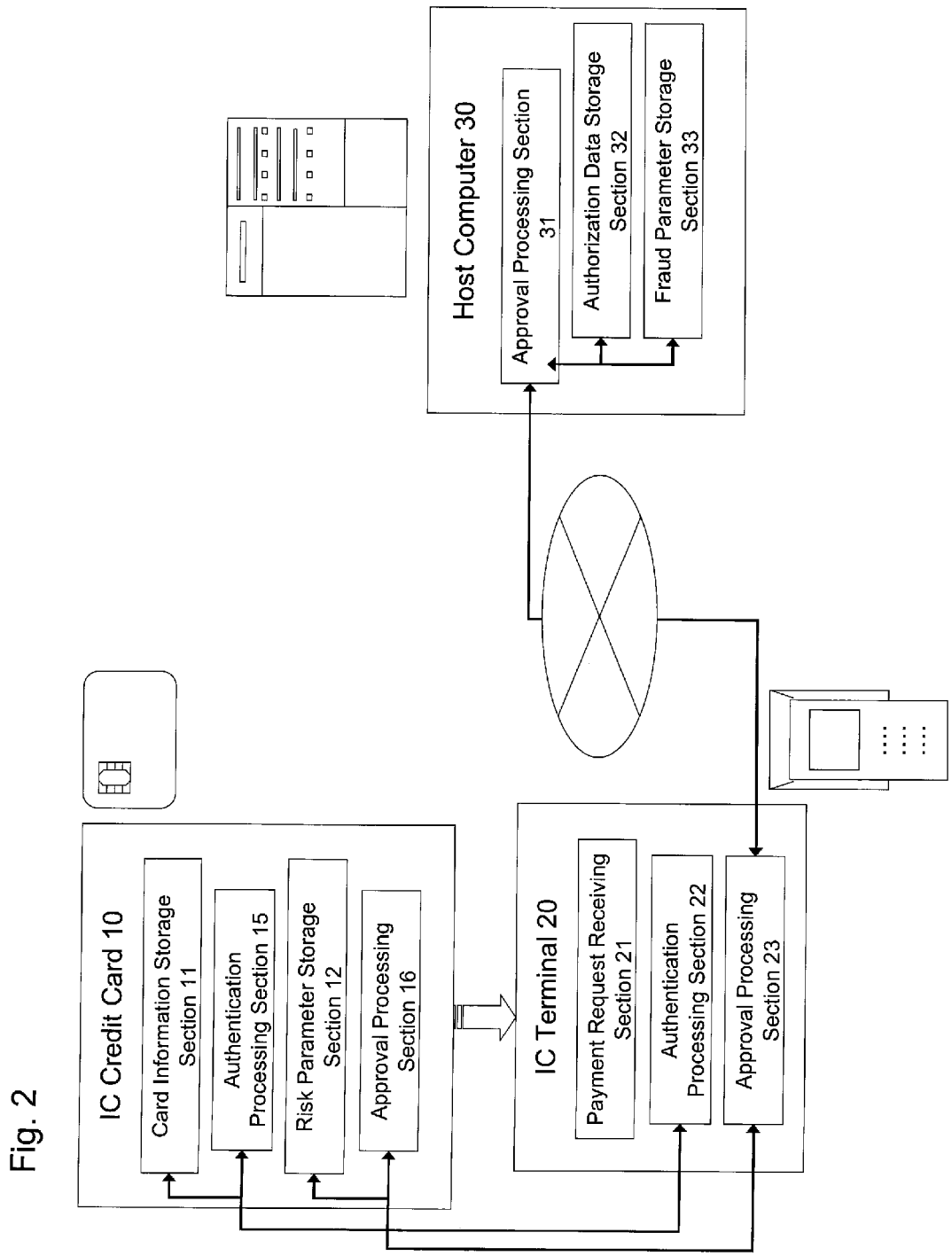
FIG. 2 is a second block diagram showing the structure of a payment approval system for the conventional credit cards.
Figure 3:
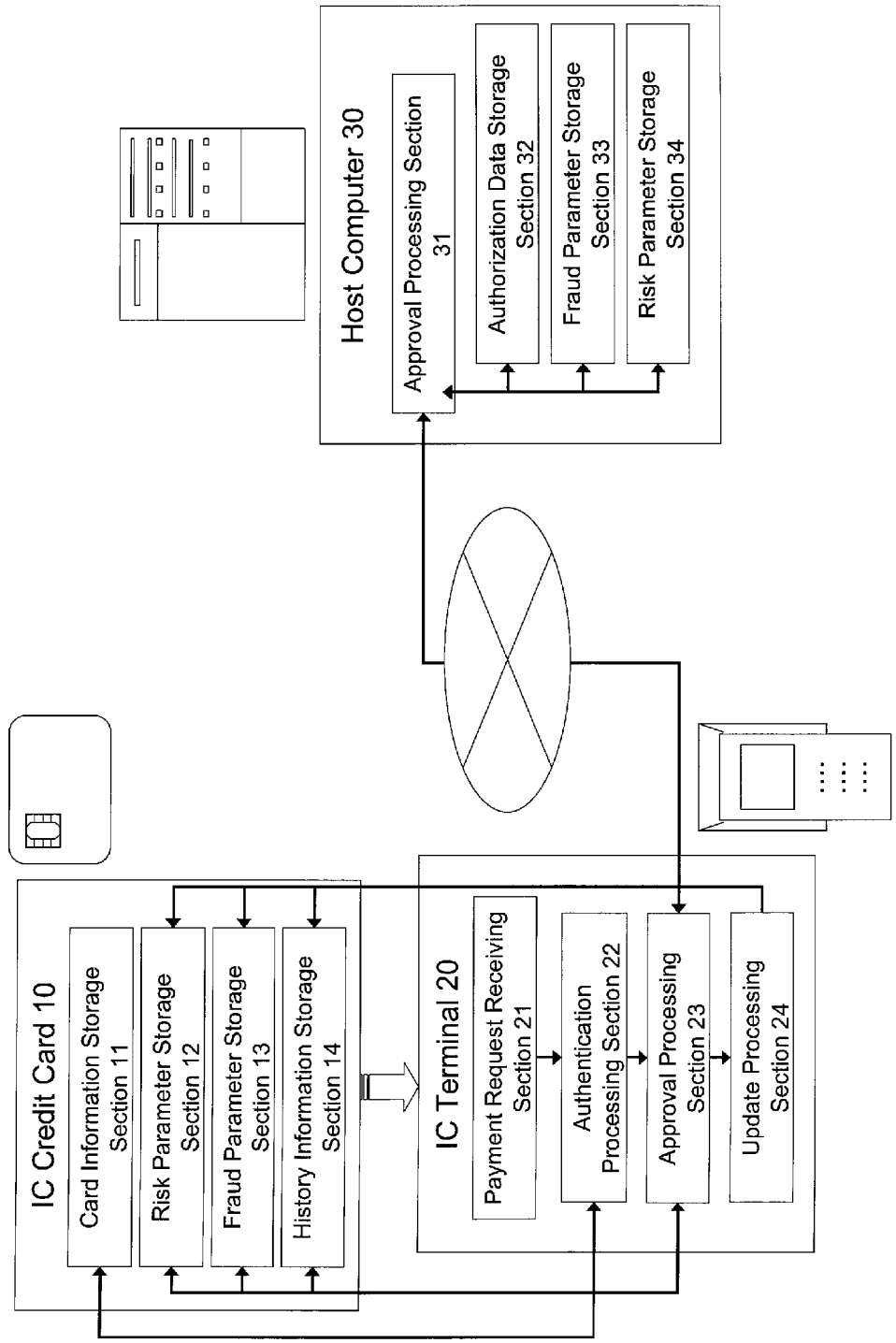
FIG. 3 is a block diagram showing the structure of a payment approval system for the credit cards in accordance with the first embodiment of the present invention.
Figure 4:
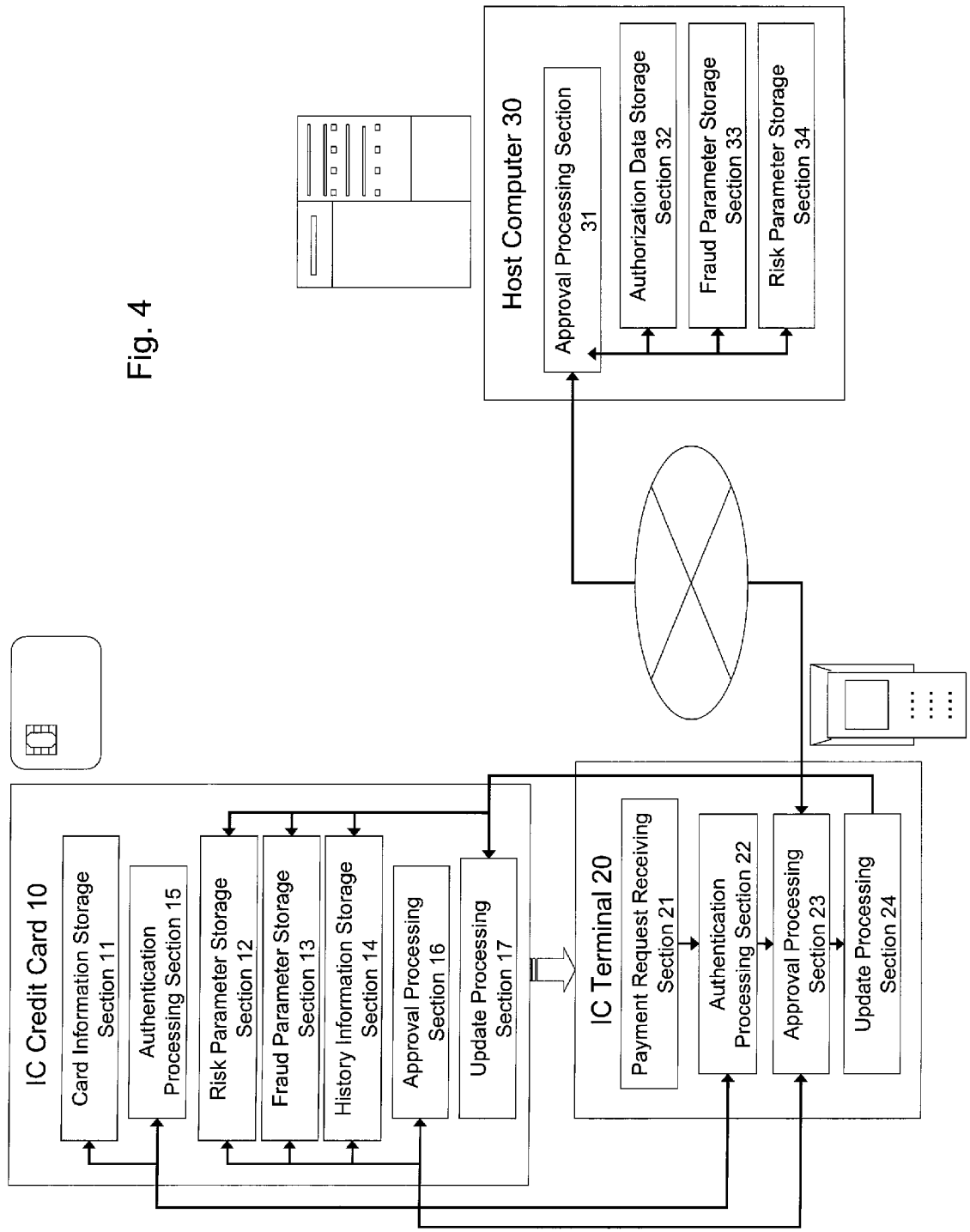
FIG. 4 is a block diagram showing the structure of a payment approval system for the credit cards in accordance with the second embodiment of the present invention.
Figure 8:
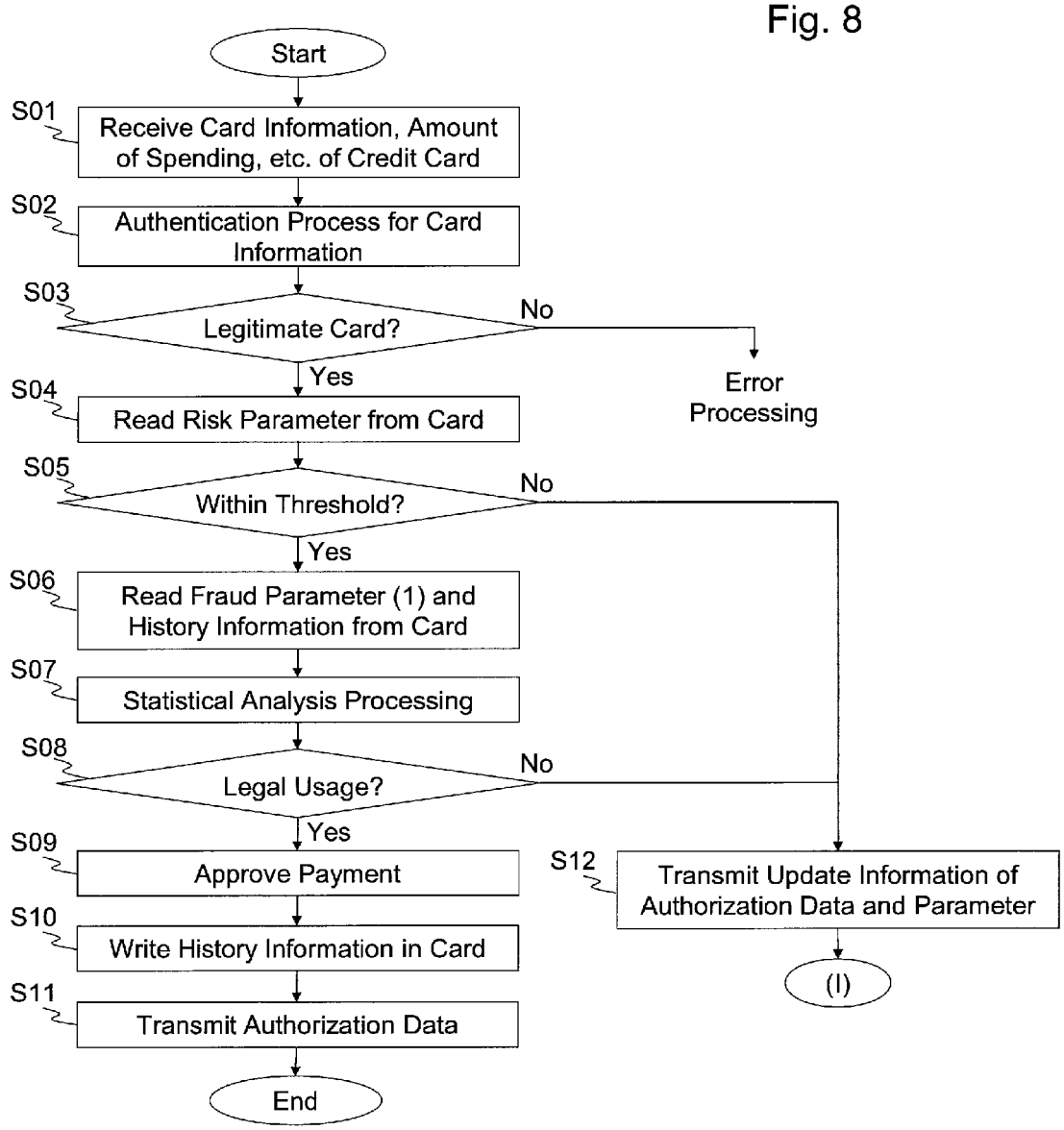
FIG. 8 is a flow chart showing the flow of the approval process on the terminal side in the method for approving a payment of the credit card in accordance with the first embodiment of the present invention.
Figure 9:
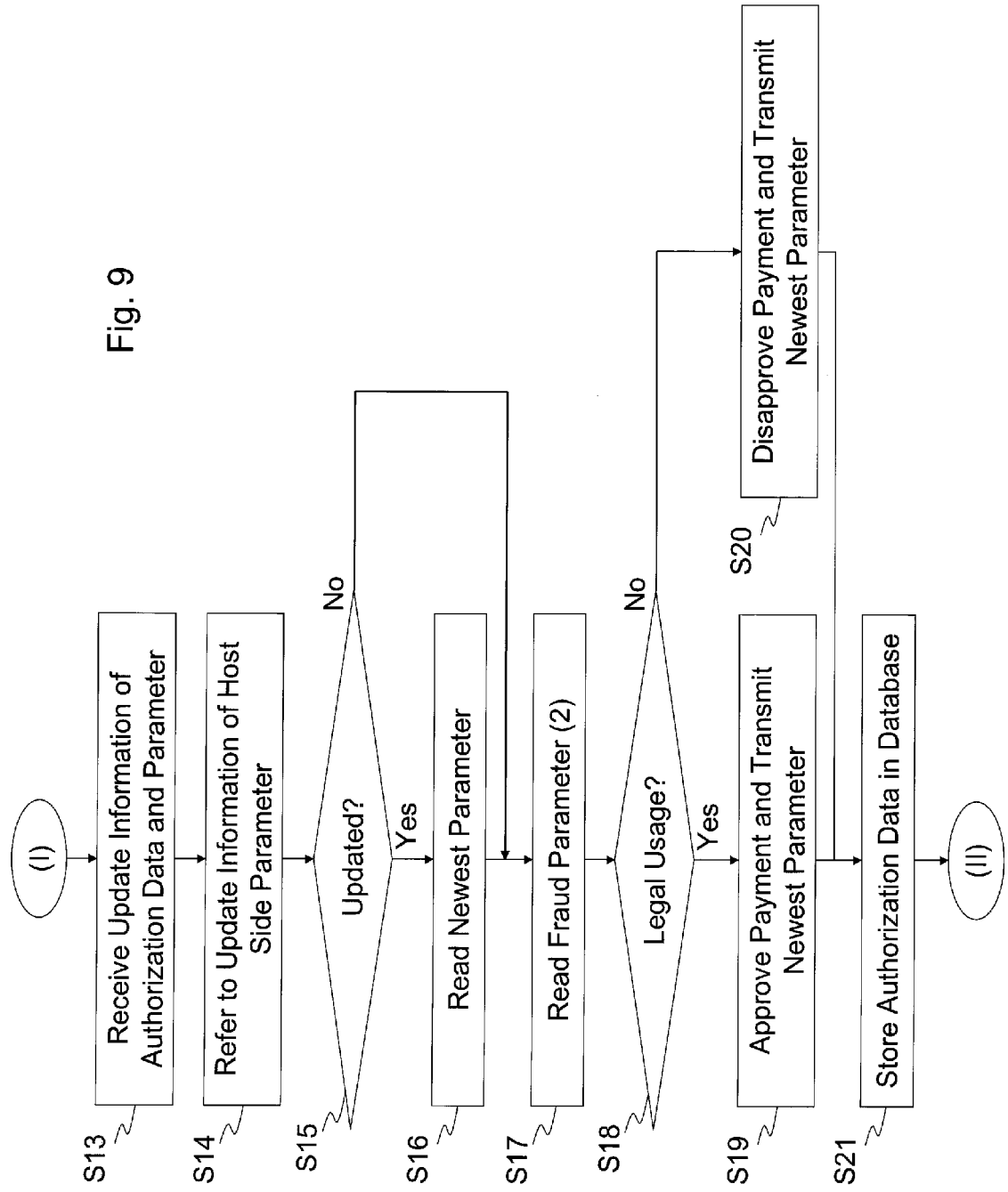
FIG. 9 is a flow chart showing the process flow in the host side computer system in the method for approving a payment of the credit card in accordance with the present invention.
Figure 10:
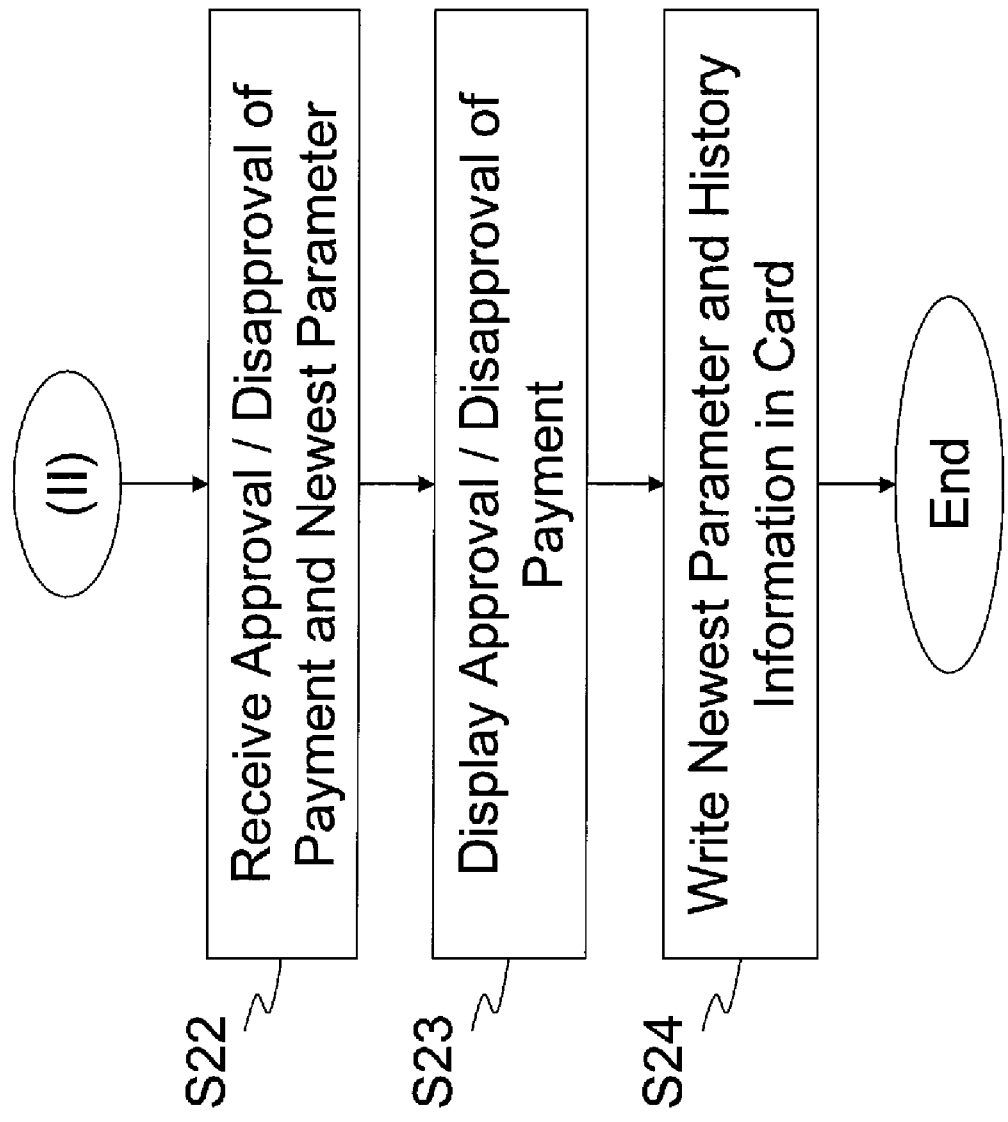
FIG. 10 is a flow chart showing the flow of an update process of parameters etc. on the terminal side in the method for approving a payment of the credit card in accordance with the present invention.
Figure 11:
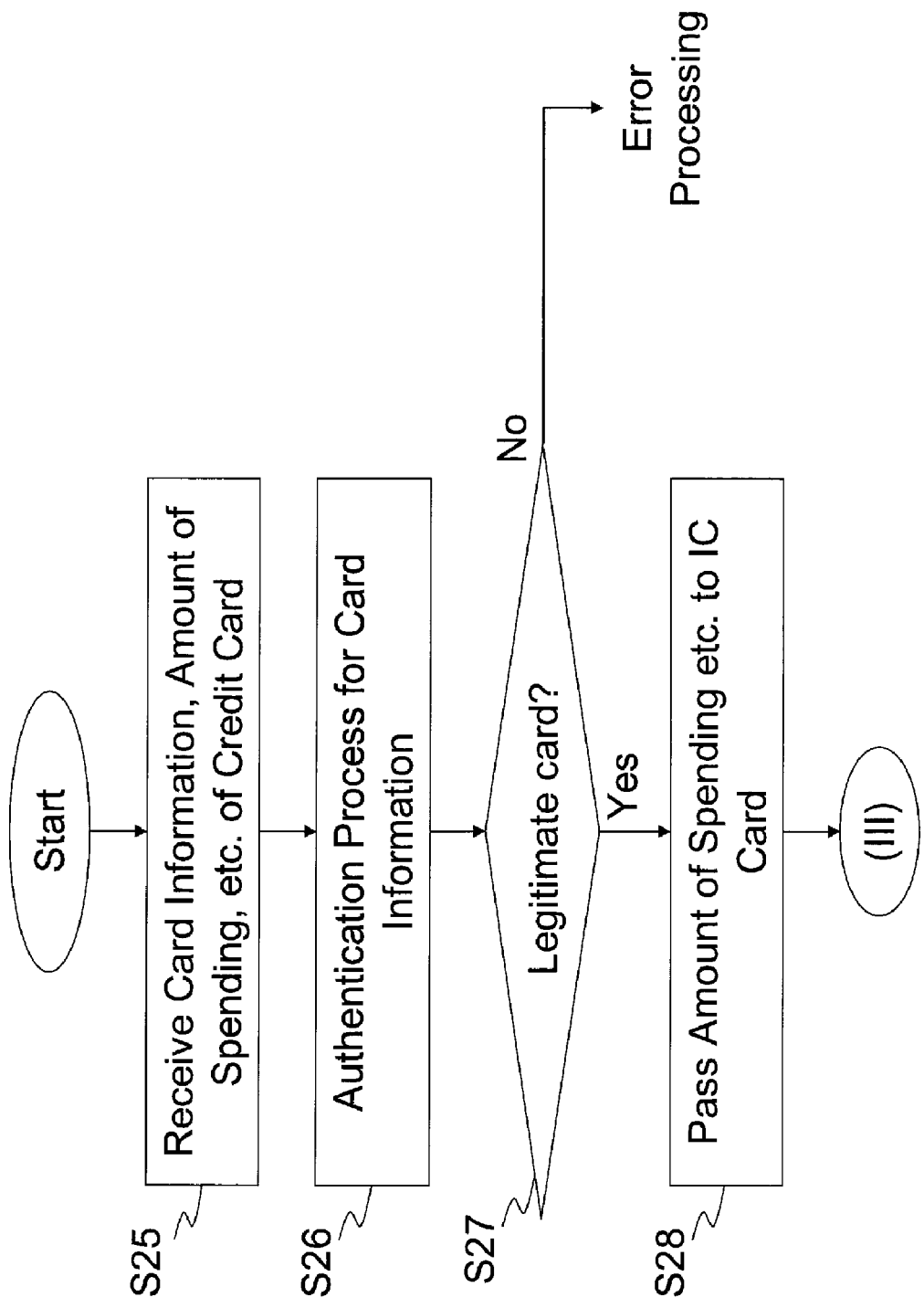
FIG. 11 is a flow chart showing the flow of the approval process on the terminal side in the method for approving a payment of the credit card in accordance with the second embodiment of the present invention.
Figure 12:
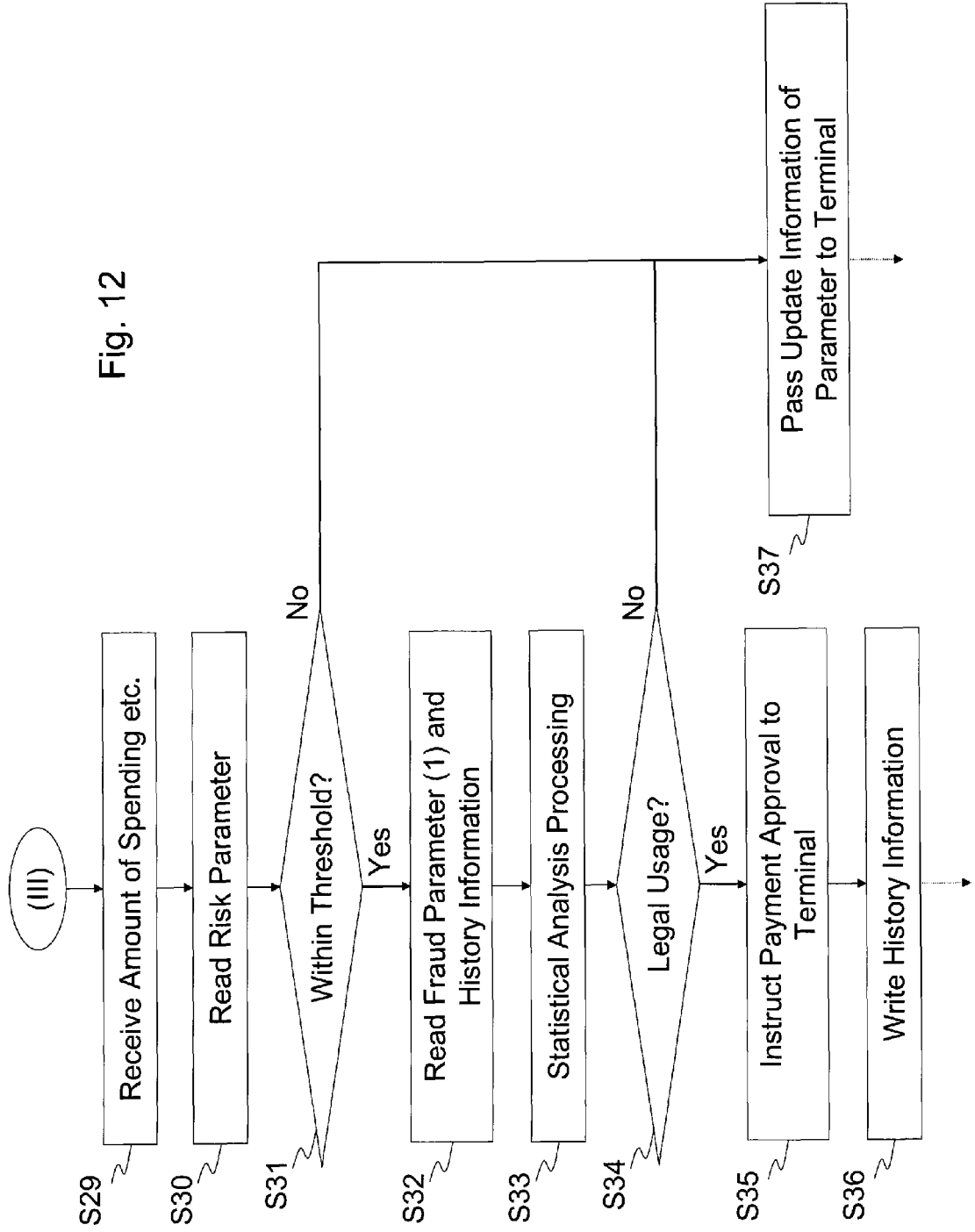
FIG. 12 is a flow chart showing the flow of the approval process in the IC card in the method for approving a payment of the credit card in accordance with the second embodiment of the present invention.
Figure 13:
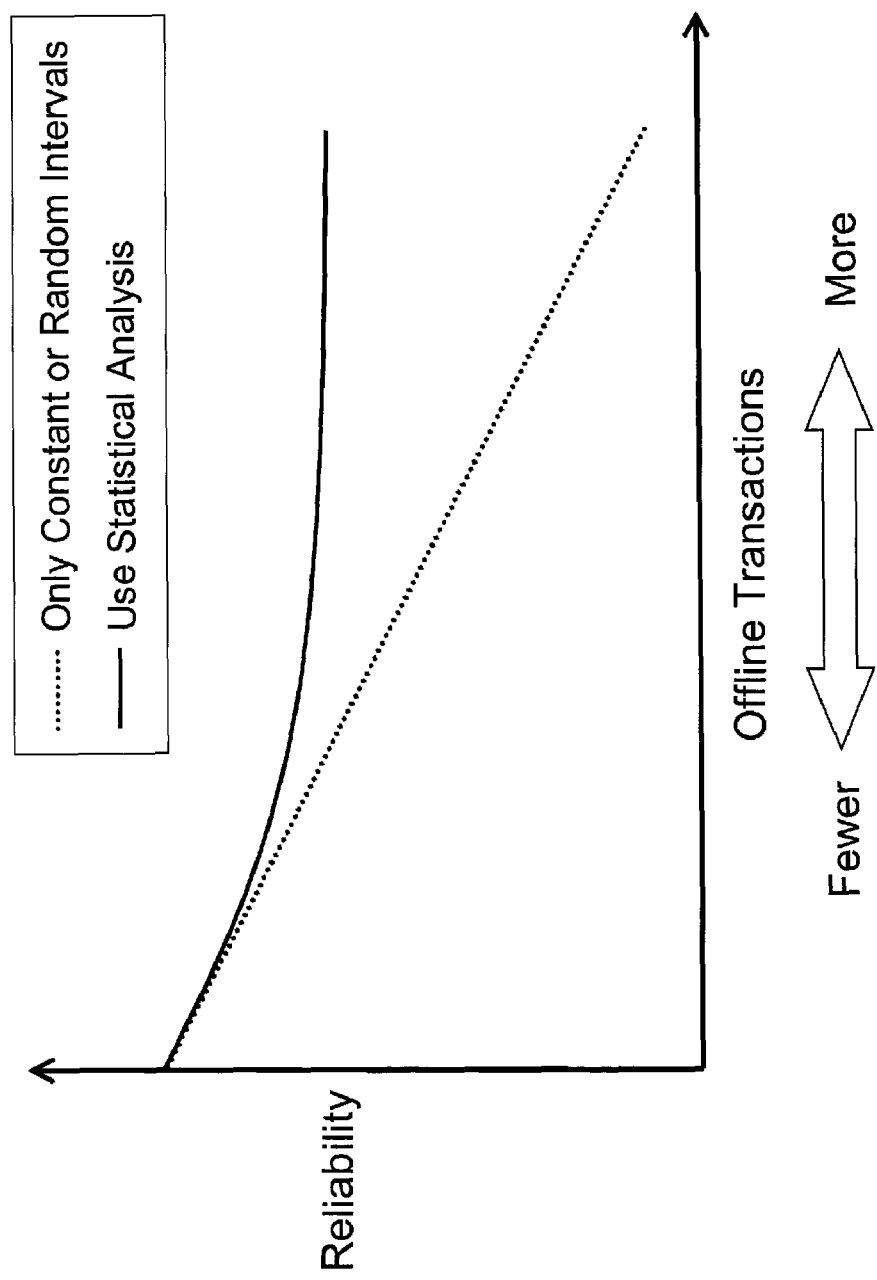
FIG. 13 is a first figure showing that the efficiency of the approval process can be improved while maintaining reliability with the payment approval system for the credit card in accordance with the present invention.
Figure 14:
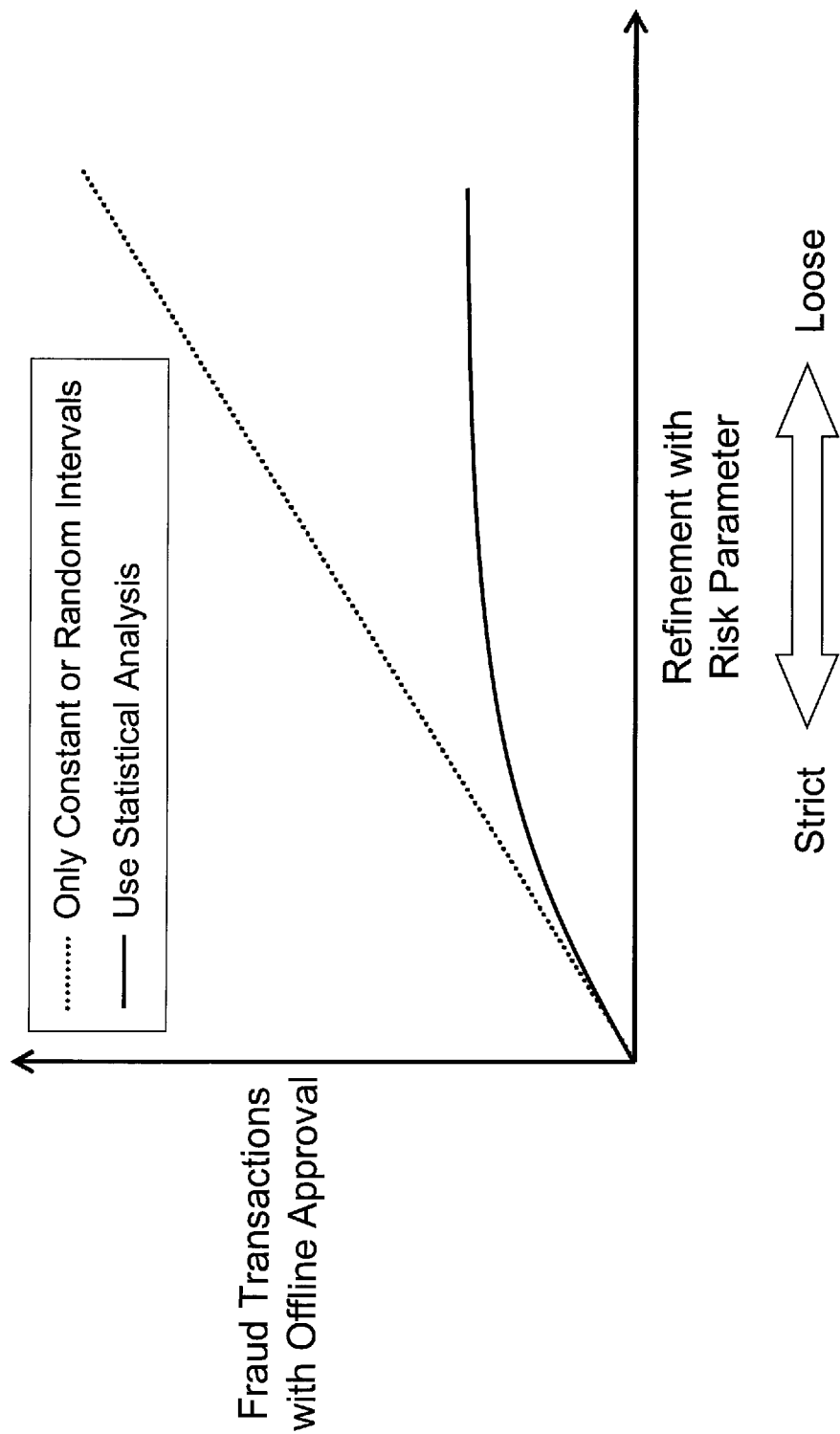
FIG. 14 is a second figure showing that the efficiency of the approval process can be improved while maintaining reliability with the payment approval system for the credit card in accordance with the present invention.

10: IC credit card
11: Card information storage section
12: Risk parameter storage section
13: Fraud parameter storage section
14: History information storage section
15: Authentication processing section
16: Approval processing section
17: Update processing section
20: IC terminal
21: Payment request receiving section
22: Authentication processing section
23: Approval processing section
24: Update processing section
30: Host computer
31: Approval processing section
32: Authorization data storage section
33: Fraud parameter storage section
34: Risk parameter storage section

The invention claimed is:

1. A payment approval system for a credit card comprising:
a terminal having read and write functions to read data from and write data to an IC chip equipped in the credit card; and,
a host computer connected to the terminal via a network, the terminal comprising:
payment request receiving means for receiving a payment request based on the credit card;
fraud parameter reading means for reading a first fraud parameter stored in the IC chip, the first fraud parameter obtained by modeling a pattern of fraud usage of credit cards;
fraud parameter judging means for judging whether a possibility of fraud usage related to the payment request satisfies criteria for requiring online approval by comparing the payment request to the first fraud parameter; and,
payment information transmitting means for transmitting payment information generated from the payment request to the host computer when the fraud parameter judging means judges that the criteria for requiring online approval is satisfied,
the host computer comprising:
fraud parameter storing means for storing a second fraud parameter obtained by modeling the pattern of fraud usage of credit cards;
payment approval judging means for judging whether the possibility of fraud usage related to the payment request satisfies the criteria for approving the payment by comparing the payment information received from the terminal to the second fraud parameter stored in the fraud parameter storing means; and,
determined result transmitting means for transmitting to the terminal a determined result of approval or disapproval judged by the payment approval judging means.

2. The payment approval system according to claim 1, wherein the fraud parameter storing means for storing a second fraud parameter comprises a second fraud parameter storing means,
wherein the terminal comprises fraud parameter updating means for updating the first fraud parameter stored in the IC chip with a new first fraud parameter,
wherein the payment information transmitting means transmits update information for specifying an update time of the first fraud parameter read from the IC chip, as well as the payment information, to the host computer when the fraud parameter judging means judges that the criteria for requiring online approval is satisfied,
wherein the host computer comprises first fraud parameter storing means for storing the first fraud parameter based on the same model as the fraud parameter stored in the IC chip, update information judging means for judging whether the update information received from the terminal matches update information for specifying an update time of a newest first fraud parameter stored in the first fraud parameter storing means, and fraud parameter reading and transmitting means for reading the newest first fraud parameter from the first fraud parameter storing means and for transmitting the newest first fraud parameter to the terminal when the update information judging means judges that the update information do not match, and
wherein the fraud parameter updating means updates the first fraud parameter stored in the IC chip with the newest first fraud parameter transmitted by the host computer.

3. The payment approval system according to claim 2, wherein the payment information transmitted by the payment information transmitting means includes identification information for identifying a user of the credit card,
wherein the first fraud parameter storing means stores the first fraud parameter configured for each of a plurality of users of the credit card, the first fraud parameter being related to the identification information, and
wherein the fraud parameter reading and transmitting means reads the newest first fraud parameter corresponding to the identification information included in the payment information from the first fraud parameter storing means and transmits the newest first fraud parameter to the terminal.

4. The payment approval system according to claim 1, wherein the terminal comprises:
history information reading means for reading history information stored in the IC chip, the history information being related to usage history of the credit card; and,
history information updating means for updating the history information stored in the IC chip with a reflection of a payment in accordance with the payment request when the payment request is approved,
wherein the fraud parameter judging means judges whether the possibility of fraud usage related to the payment request satisfies the criteria for requiring online approval by comparing the payment request and the history information to the fraud parameter.

5. The payment approval system according to claim 1, wherein the payment information transmitting means comprises first payment information transmitting means, and wherein the terminal comprises:
risk parameter reading means for reading a risk parameter stored in the IC chip, wherein the risk parameter is configured with a rule for requiring online approval about the credit card;
risk parameter judging means for judging whether the payment request satisfies the rule for requiring online approval by comparing the payment request to the risk parameter; and,
second payment information transmitting means for transmitting payment information generated from the payment request to the host computer when the risk parameter judging means judges that the rule for requiring online approval is satisfied.

6. The payment approval system according to claim 5, wherein the terminal comprises risk parameter updating means for updating the risk parameter stored in the IC chip with a new risk parameter,
wherein the second payment information transmitting means transmits update information for specifying an update time of the risk parameter read from the IC chip, as well as the payment information, to the host computer when the risk parameter judging means judges that the rule for requiring online approval is satisfied, and
wherein the host computer comprises:
risk parameter storing means for storing the risk parameter configured with the rule for requiring online approval about the credit card;
update information judging means for judging whether the update information received from the terminal matches update information that specifies an update time of a newest risk parameter stored in the risk parameter storing means; and
risk parameter reading and transmitting means for reading the newest risk parameter from the risk parameter storing means and transmitting the newest risk parameter to the terminal when the update information judging means judges that the update information do not match, and wherein the risk parameter updating means updates the risk parameter stored in the IC chip with the newest risk parameter transmitted from the host computer.

7. The payment approval system according to claim 6, wherein the payment information transmitted by the second payment information transmitting means includes identification information for identifying a user of the credit card, wherein the risk parameter storing means stores the risk parameter configured for each of a plurality of users of the credit card, the risk parameter being related to the identification information, and wherein the risk parameter reading and transmitting means reads the newest risk parameter corresponding to the identification information included in the payment information from the risk parameter storing means and transmits the newest risk parameter to the terminal.

8. A payment approval system for a credit card comprising:
a credit card equipped with an IC chip; and,
a host computer connected to a terminal via a network, wherein the terminal is arranged to read information stored in the IC chip and to write information to the IC chip, wherein the credit card comprises:

first fraud parameter storing means for storing a first fraud parameter obtained by modeling a pattern of fraud usage of credit cards;

payment request receiving means for receiving from the terminal a payment request based on the credit card;

fraud parameter reading means for reading the first fraud parameter from the first fraud parameter storing means;

fraud parameter judging means for judging whether a possibility of fraud usage in connection with the payment request satisfies criteria for requiring online approval by comparing the payment request to the first fraud parameter; and, payment information instructing means for instructing the terminal to transmit payment information generated from the payment request to the host computer when the fraud parameter judging means judges that the criteria for requiring online approval is satisfied;

wherein the host computer comprises:

second fraud parameter storing means for storing a second fraud parameter obtained by modeling the pattern of fraud usage of credit cards;

payment approval judging means for judging whether the possibility of fraud usage in connection with the payment request satisfies the criteria for approving the payment by comparing the payment information received from the terminal to the second fraud parameter stored in the second fraud parameter storing means of the host computer; and, determined result transmitting means for transmitting a determined result of approval or disapproval judged by the payment approval judging means to the terminal.

9. The payment approval system according to claim 8, wherein the credit card comprises fraud parameter updating means for updating the first fraud parameter stored in the first fraud parameter storing means of the credit card with a new first fraud parameter, wherein the payment information instructing means instructs the terminal to transmit update information for specifying an update time of the first fraud parameter read from the IC chip, as well as the payment information, to the host computer when the fraud parameter judging means judges that the criteria for requiring online approval is satisfied, wherein the host computer comprises:

third fraud parameter storing means for storing the first fraud parameter based on the same model as the fraud parameter stored in the IC chip;

update information judging means for judging whether the update information received from the terminal matches update information for specifying an update time of a newest first fraud parameter stored in the third fraud parameter storing means; and, fraud parameter reading and transmitting means for reading the newest first fraud parameter from the third fraud parameter storing means and transmitting the newest first fraud parameter to the terminal when the update information judging means judges that the update information do not match, and wherein the fraud parameter updating means of the credit card updates the first fraud parameter stored in the IC chip with the newest first fraud parameter received by the terminal from the host computer.

10. The payment approval system according to claim 9, wherein the payment information transmitted to the host computer as instructed by the payment information instructing means of the credit card includes identification information for identifying a user of the credit card, wherein the third fraud parameter storing means of the host computer stores the first fraud parameter configured for each of a plurality of users of the credit card, the first fraud parameter being related to the identification information, and the fraud parameter reading and transmitting means of the host computer reads the newest first fraud parameter corresponding to the identification information included in the payment information from the third fraud parameter storing means and transmits the newest first fraud parameter to the terminal.

11. The payment approval system according to claim 8, wherein the credit card comprises:

history information storing means for storing history information about usage history of the credit card;

history information reading means for reading the history information from the history information storing means; and, history information updating means for updating the history information stored in the history information storing means with a reflection of a payment in accordance with the payment request when the payment request is approved, and wherein the fraud parameter judging means judges whether the possibility of fraud usage in connection with the payment request satisfies the criteria for requiring online approval by comparing the payment request and the history information to the fraud parameter.

12. The payment approval system according to claim 8, wherein the payment information instructing means comprises first payment information instructing means, and wherein the credit card comprises:

risk parameter storing means for storing a risk parameter configured with a rule for requiring online approval about the credit card;

risk parameter reading means for reading the risk parameter stored in the risk parameter storing means;

risk parameter judging means for judging whether the payment request satisfies the rule for requiring online approval by comparing the payment request to the risk parameter; and, second payment information instructing means for instructing the terminal to transmit the payment information generated from the payment request to the host computer when the risk parameter judging means judges that the rule for requiring online approval is satisfied.

13. The payment approval system according to claim 12, wherein the credit card further comprises risk parameter updating means for updating the risk parameter stored in the risk parameter storing means with a new risk parameter, wherein the second payment information instructing means instructs the terminal to transmit update information for specifying an update time of the risk parameter read from the IC chip, as well as the payment information, to the host computer when the risk parameter judging means judges that the rule for requiring online approval is satisfied, wherein the host computer comprises:

risk parameter storing means for storing the risk parameter configured with the rule for requiring online approval about the credit card;

update information judging means for judging whether the update information received from the terminal matches update information for specifying an update time of a newest risk parameter stored in the risk parameter storing means; and, risk parameter reading and transmitting means for reading the newest risk parameter from the risk parameter storing means and transmitting the newest risk parameter to the terminal when the update information judging means judges that the update information do not match, and wherein the risk parameter updating means of the credit card updates the risk parameter stored in the risk parameter storing means of the credit card with the newest risk parameter received by the terminal from the host computer.

14. The payment approval system according to claim 13, wherein the payment information transmitted to the host computer as instructed by the second payment information instructing means of the credit card includes identification information for identifying a user of the credit card, wherein the risk parameter storing means of the host computer stores the risk parameter configured for each of a plurality of users of the credit card, the risk parameter being related to the identification information, and wherein the risk parameter reading and transmitting means of the host computer reads the newest risk parameter corresponding to the identification information included in the payment information from the risk parameter storing means and transmits the newest risk parameter to the terminal.

15. A method for approving a payment of a credit card transaction performed by a terminal provided with read and write functions with respect to an IC chip equipped in a credit card and by a host computer connected to the terminal via a network, the method comprising:

accepting a payment request in connection with the credit card, wherein the accepting of the payment request is performed by the terminal;

reading a first fraud parameter stored in the IC chip, wherein the first fraud parameter is obtained by modeling a pattern of fraud usage of credit cards, and wherein the reading of the first fraud parameter is performed by the terminal;

judging whether a first possibility of fraud usage of the credit card in connection with the payment request satisfies criteria for requiring online approval by comparing the payment request to the first fraud parameter, wherein the judging of a first possibility of fraud usage is performed by the terminal;

transmitting payment information generated from the payment request to the host computer when the terminal judges that the criteria for requiring online approval is satisfied, wherein the transmitting of payment information is performed by the terminal;

judging whether a second possibility of fraud usage of the payment request satisfies the criteria for approving the payment by comparing the payment information received from the terminal to a second fraud parameter stored by the host computer, wherein the second fraud parameter is obtained by modeling the pattern of fraud usage of credit cards, and wherein the judging of whether a second possibility of fraud usage of the payment request satisfies the criteria is performed by the host computer; and, transmitting to the terminal a determined result of approval or disapproval in response to the judging performed by the host computer, wherein the transmitting of a determined result of approval or disapproval is performed by the host computer.

16. The method for approving a payment according to claim 15, the method further comprising:

if the terminal judges that the criteria for requiring online approval is satisfied, transmitting update information for specifying an update time of the first fraud parameter read by the terminal from the IC chip, as well as the payment information, to the host computer, wherein the transmitting of update information is performed by the terminal;

judging whether the update information received from the terminal matches update information for specifying an update time of a newest first fraud parameter stored by the host computer, wherein the newest first fraud parameter stored by the host computer is based on the same model as the fraud parameter stored by the IC chip, and wherein the judging of the update information is performed by the host computer;

reading the newest first fraud parameter stored by the host computer and transmitting the newest first fraud parameter to the terminal when it is judged that the update information do not match, wherein the reading and transmitting of the newest first fraud parameter is performed by the host computer; and, updating the first fraud parameter stored in the IC chip with the newest first fraud parameter transmitted from the host computer, wherein the updating of the first fraud parameter is performed by the terminal.

17. The method for approving a payment according to claim 16, wherein the transmitting of payment information to the host computer includes transmitting with the payment information identification information that identifies a user of the credit card, wherein the method further comprises storing by the host computer the first fraud parameter configured for each of a plurality of users of the credit card, the first fraud parameter being related to the identification information, and wherein the reading and transmitting of the newest first fraud parameter comprises reading the newest first fraud parameter corresponding to the identification information included in the payment information and transmitting the newest first fraud parameter to the terminal, wherein the reading and transmitting of the newest first fraud parameter corresponding to the identification information is performed by the host computer.

18. The method for approving a payment according to claim 15, the method further comprising:

reading history information related to usage history of the credit card stored in the IC chip, wherein the reading of history information is performed by the terminal; and, updating the history information stored in the IC chip with a reflection of a payment in accordance with the payment request when the payment request is approved, wherein the updating of the history information is performed by the terminal, wherein the judging performed by the terminal includes judging whether the possibility of fraud usage in connection with the payment request satisfies the criteria for requiring online approval by comparing the payment request and the history information to the fraud parameter.

19. A method of approving a payment of a credit card transaction performed by a credit card and a host computer, wherein the credit card is equipped with an IC chip, wherein the host computer is connected to a terminal via a network, and wherein the terminal is arranged to read information from and write information to the IC chip, the method comprising:

accepting a payment request from the terminal, wherein the accepting of a payment request is performed by the credit card;

reading a first fraud parameter stored by the IC chip, wherein the first fraud parameter is obtained by modeling the pattern of fraud usage of credit cards, and wherein the reading of the first fraud parameter is performed by the credit card;

judging whether a first possibility of fraud usage of the payment request satisfies criteria for requiring online approval by comparing the payment request to the first fraud parameter, wherein the judging of whether a first possibility of fraud usage of the payment request satisfies criteria is performed by the credit card;

instructing the terminal to transmit payment information generated from the payment request to the host computer when the criteria for requiring online approval is satisfied, wherein the instructing of the terminal to transmit payment information is performed by the credit card;

judging whether a second possibility of fraud usage of the payment request satisfies the criteria for approving the payment by comparing the payment information received from the terminal to a second fraud parameter stored in the host computer, wherein the second fraud parameter is obtained by modeling the pattern of fraud usage of credit cards, and wherein the judging of whether the second possibility of fraud usage of the payment request satisfies the criteria is performed by the host computer; and, transmitting to the terminal a determined result of approval or disapproval in response to the judging performed by the host computer, wherein the transmitting of a determined result of approval or disapproval is performed by the host computer.

20. The method for approving a payment according to claim 19, the method further comprising:

if the criteria for requiring online approval is satisfied, instructing the terminal to transmit update information for specifying an update time of the first fraud parameter read from the IC chip, as well as the payment information, to the host computer, wherein the instructing of the terminal to transmit update information is performed by the credit card;

judging whether the update information received from the terminal matches update information for specifying an update time of a newest first fraud parameter stored by the host computer, wherein the newest first fraud parameter stored by the host computer is based on the same model as the fraud parameter stored in the IC chip, wherein the judging of whether the update information received from the terminal matches the update information is performed by the host computer;

reading the newest first fraud parameter stored by the host computer and transmitting the newest first fraud parameter to the terminal when it is judged that the update information do not match, wherein the reading and transmitting of the newest first fraud parameter is performed by the host computer; and, updating the first fraud parameter stored by the IC chip with the newest first fraud parameter received by the terminal from the host computer, wherein the updating of the first fraud parameter with the newest first fraud parameter is performed by the credit card.

21. The method for approving a payment according to claim 20, wherein the instructing of the terminal to transit payment information comprises instructing the terminal to transmit the payment information including identification information that identifies a user of the credit card to the host computer, wherein the method further comprises storing in the host computer the first fraud parameter configured for each of a plurality of users of the credit card, the first fraud parameter being related to the identification information, and wherein the reading and transmitting of the newest first fraud parameter comprises reading the newest first fraud parameter corresponding to the identification information included in the payment information and transmitting the newest first fraud parameter to the terminal, wherein the reading and transmitting of the newest first fraud parameter is performed by the host computer.

22. The method for approving a payment according to claim 19, the method further comprising:

reading history information from a memory of the IC chip, wherein the history information relates to a usage history of the credit card, and wherein the reading of history information is performed by the credit card;

updating the history information stored in the memory of the IC chip with a reflection of a payment in connection with the payment request when the payment request is approved, wherein the updating of the history information is performed by the credit card; and, wherein the judging of whether a first possibility of fraud usage of the payment request satisfies criteria comprises judging whether the possibility of fraud usage of the payment request satisfies the criteria for requiring online approval by comparing the payment request and the history information to the fraud parameter.

* * * * *